US012710750B2

(12) United States Patent
Noguchi et al.

(10) Patent No.: US 12,710,750 B2
(45) Date of Patent: Aug. 18, 2026

(54) CONTROL DEVICE, CONTROL SYSTEM, CONTROL METHOD, AND RECORDING MEDIUM

(71) Applicant: HONDA MOTOR CO., LTD., Tokyo (JP)

(72) Inventors: Junpei Noguchi, Tokyo (JP); Gaku Shimamoto, Tokyo (JP); Takuma Sekino, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 18/099,605

(22) Filed: Jan. 20, 2023

(65) Prior Publication Data

US 2023/0236592 A1 Jul. 27, 2023

(30) Foreign Application Priority Data

Jan. 24, 2022 (JP) ................................ 2022-008957

(51) Int. Cl.
*G05D 1/00* (2006.01)
*B60W 30/06* (2006.01)

(52) U.S. Cl.
CPC .......... *G05D 1/0011* (2013.01); *B60W 30/06* (2013.01); *B60W 2556/45* (2020.02)

(58) Field of Classification Search
CPC ... G05D 1/0016; G05D 1/0011; H04W 8/005; H04W 4/40; H04W 4/44; H04W 76/10;
(Continued)

(56) References Cited

U.S. PATENT DOCUMENTS

2010/0037057 A1* 2/2010 Shim .................. H04W 12/069 726/4
2013/0066667 A1* 3/2013 Gulec .................. G06Q 10/06 705/7.13

(Continued)

FOREIGN PATENT DOCUMENTS

CN 111746510 A 10/2020
CN 112424043 A 2/2021

(Continued)

OTHER PUBLICATIONS

Jun. 4, 2024, translation of Japanese Office Action issued for related JP Application No. 2023-169612.

(Continued)

*Primary Examiner* — Wilson W Tsui
(74) *Attorney, Agent, or Firm* — Paratus Law Group, PLLC

(57) ABSTRACT

A control device of a moving object includes: a communication unit configured to communicate with an information terminal carried by a user of the moving object; and a controller configured to perform movement control of the moving object. When a predetermined operation from the user of the moving object is received, the controller transmits inquiry information on driver determination to the information terminals around the moving object, the controller receives predetermined answer information for the inquiry information, the controller selects an information terminal, which is a transmission source of the answer information that is received first, as a driver terminal, and the controller performs movement control of the moving object based on movement instruction information from the driver terminal.

7 Claims, 14 Drawing Sheets

(58) Field of Classification Search
CPC .............. B60W 30/06; B60W 2556/45; B62D 15/0285; B62D 1/00
See application file for complete search history.

(56) References Cited

U.S. PATENT DOCUMENTS

| | | | | |
|---|---|---|---|---|
| 2014/0310788 | A1* | 10/2014 | Ricci | H04W 4/12 726/6 |
| 2015/0312706 | A1 | 10/2015 | Takahashi et al. | |
| 2015/0341450 | A1* | 11/2015 | Reunamaki | H04L 67/52 705/14.58 |
| 2017/0134593 | A1 | 5/2017 | Kadoda et al. | |
| 2017/0208422 | A1* | 7/2017 | Grover | H04W 4/80 |
| 2017/0231016 | A1* | 8/2017 | Park | H04W 12/068 |
| 2017/0331696 | A1* | 11/2017 | Gupta | H04W 4/023 |
| 2018/0347533 | A1 | 12/2018 | Tamane et al. | |
| 2018/0364696 | A1 | 12/2018 | Lavoie | |
| 2019/0286121 | A1 | 9/2019 | Bando et al. | |
| 2019/0302754 | A1* | 10/2019 | Tsuruoka | G05D 1/0212 |
| 2020/0004341 | A1* | 1/2020 | Li | B60Q 1/507 |
| 2020/0084314 | A1* | 3/2020 | Mahar | H04W 4/021 |
| 2020/0310410 | A1 | 10/2020 | Noguchi et al. | |
| 2021/0053555 | A1 | 2/2021 | Sugiyama et al. | |
| 2021/0111871 | A1* | 4/2021 | Chin | H04W 4/44 |
| 2021/0245734 | A1 | 8/2021 | Harai et al. | |
| 2021/0246693 | A1* | 8/2021 | Elangovan | G06F 21/44 |
| 2022/0130234 | A1* | 4/2022 | Ly-Gagnon | G08C 17/02 |
| 2023/0128580 | A1 | 4/2023 | Heim | |

FOREIGN PATENT DOCUMENTS

| | | | |
|---|---|---|---|
| DE | 102019133223 | B3 | 3/2021 |
| JP | 2002-268848 | A | 9/2002 |
| JP | 2003-037048 | A | 2/2003 |
| JP | 2006-148290 | A | 6/2006 |
| JP | 2007-188355 | A | 7/2007 |
| JP | 2015-070463 | A | 4/2015 |
| JP | 2015-211232 | A | 11/2015 |
| JP | 2017-092590 | A | 5/2017 |
| JP | 2018-127066 | A | 8/2018 |
| JP | 2018-204473 | A | 12/2018 |
| JP | 2019-097024 | A | 6/2019 |
| JP | 2019-156299 | A | 9/2019 |
| JP | 2020-032895 | A | 3/2020 |
| JP | 2020-164080 | A | 10/2020 |
| JP | 2021-030855 | A | 3/2021 |

OTHER PUBLICATIONS

Jun. 26, 2025, Translation of Chinese Office Action issued for related CN Application No. 202310038101.7.

Sep. 10, 2024, translation of Japanese Office Action issued for related JP Application No. 2023-169612.

Nov. 19, 2024, translation of Japanese Decision of Dismissal of Amendment issued for related JP Application No. 2023-169612.

May 19, 2026, Translation of Japanese Office Action issued for related JP Application No. 2025-025241.

* cited by examiner

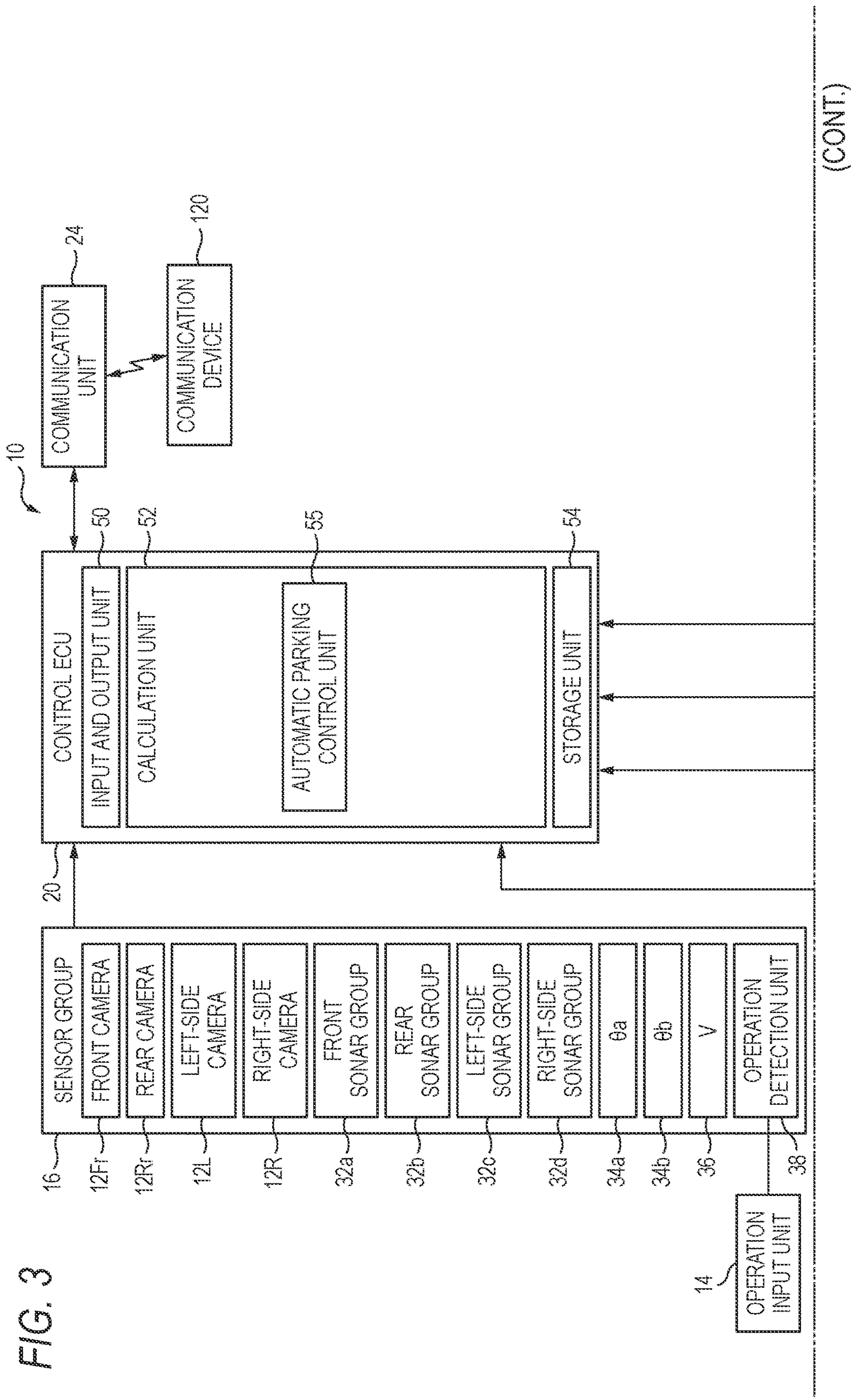
FIG. 3
10
CONTROL ECU
20
INPUT AND OUTPUT UNIT
50
CALCULATION UNIT
52
AUTOMATIC PARKING CONTROL UNIT
55
STORAGE UNIT
54
COMMUNICATION UNIT
24
COMMUNICATION DEVICE
120
SENSOR GROUP
16
FRONT CAMERA
12Fr
REAR CAMERA
12Rr
LEFT-SIDE CAMERA
12L
RIGHT-SIDE CAMERA
12R
FRONT SONAR GROUP
32a
REAR SONAR GROUP
32b
LEFT-SIDE SONAR GROUP
32c
RIGHT-SIDE SONAR GROUP
32d
θa
34a
θb
34b
V
36
OPERATION DETECTION UNIT
38
OPERATION INPUT UNIT
14
(CONT.)

(FIG. 3 CONTINUED)

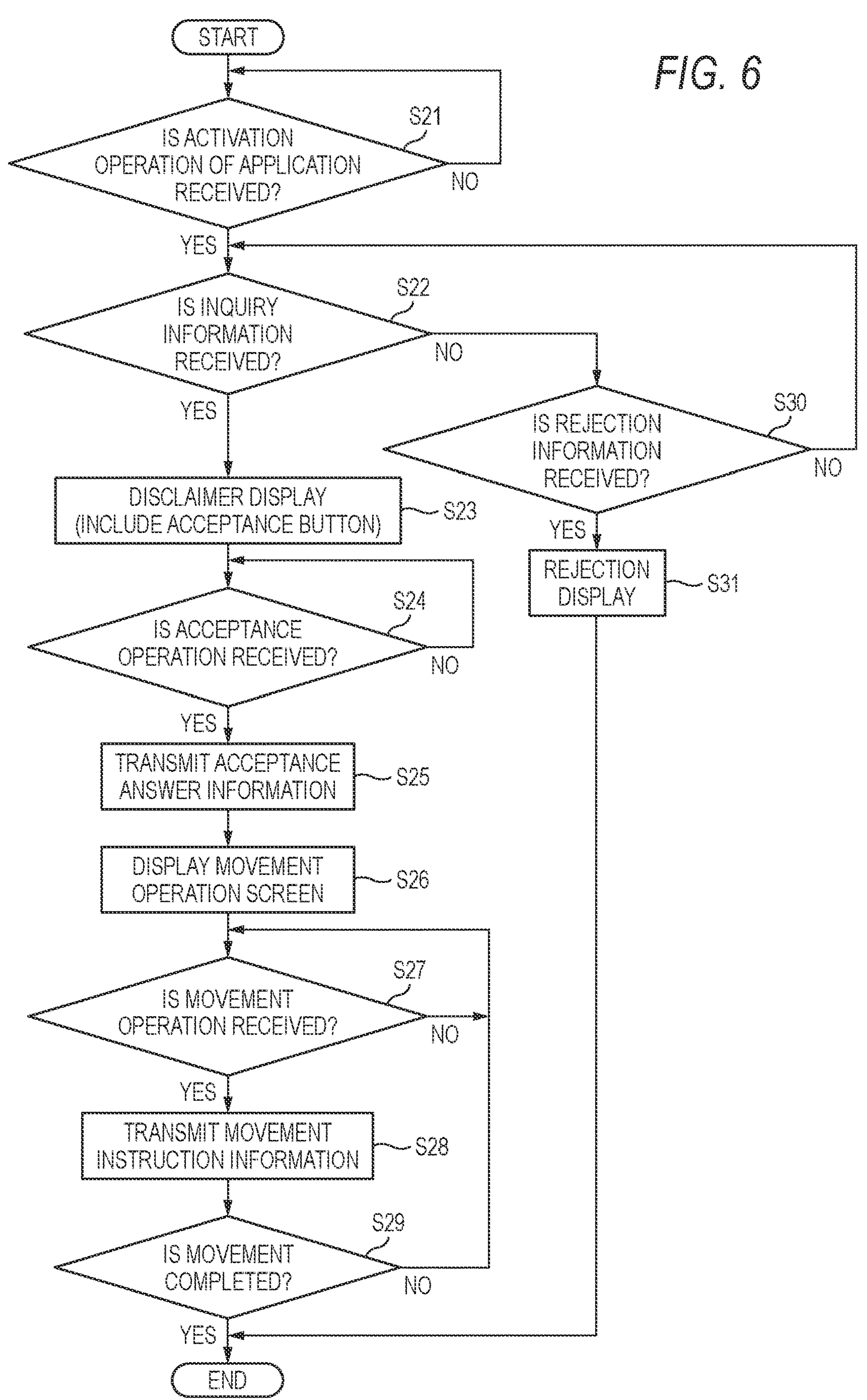
FIG. 6
START
IS ACTIVATION OPERATION OF APPLICATION RECEIVED?
S21
NO
YES
IS INQUIRY INFORMATION RECEIVED?
S22
NO
YES
IS REJECTION INFORMATION RECEIVED?
S30
NO
YES
DISCLAIMER DISPLAY (INCLUDE ACCEPTANCE BUTTON)
S23
REJECTION DISPLAY
S31
IS ACCEPTANCE OPERATION RECEIVED?
S24
NO
YES
TRANSMIT ACCEPTANCE ANSWER INFORMATION
S25
DISPLAY MOVEMENT OPERATION SCREEN
S26
IS MOVEMENT OPERATION RECEIVED?
S27
NO
YES
TRANSMIT MOVEMENT INSTRUCTION INFORMATION
S28
IS MOVEMENT COMPLETED?
S29
NO
YES
END

CONTROL DEVICE, CONTROL SYSTEM, CONTROL METHOD, AND RECORDING MEDIUM

CROSS-REFERENCE TO RELATED APPLICATIONS

This application is based on and claims priority under 35 USC 119 from Japanese Patent Application No. 2022-008957 filed on Jan. 24, 2022, the contents of which are incorporated herein by reference.

TECHNICAL FIELD

The present disclosure relates to a control device, a control system, a control method, and a recording medium storing a control program.

BACKGROUND

In recent years, improvements in traffic safety are required to make cities and human settlements inclusive, safe, resilient, and sustainable. In a vehicle, from a viewpoint of improving traffic safety, for example, it is required to ensure traffic safety even if an abnormality occurs in the vehicle.

In the related art, a remote-parking system that remotely controls a vehicle by using a smartphone to park the vehicle in a designated predetermined parking space or to cause the vehicle to leave the parking space is known. Japanese Patent Application Laid-Open Publication No. 2020-164080 (hereinafter, referred to as Patent Literature 1) discloses a remote-parking system in which execution of remote parking performed by a mobile terminal other than a first mobile terminal is prohibited while driving of the vehicle is maintained after remote-parking processing of the vehicle is set to be executed based on an instruction from the first mobile terminal.

According to the remote-parking system of Patent Literature 1, since the execution of the remote-parking operation performed by other mobile terminals can be prohibited when the remote-parking operation is executed by the first mobile terminal, operations from a plurality of terminals can be prevented from competing with each other.

However, when there are a plurality of mobile terminals that can execute the remote-parking operation, for example, even if the remote-parking operation is set to be executed by the first mobile terminal, it may be more appropriate to execute the remote-parking operation by another mobile terminal than by the first mobile terminal. Suitability of a mobile terminal that performs the operation in the remote-parking system of Patent Literature 1 is not described.

An object of the present disclosure is to provide a control device, a control system, a control method, and a recording medium storing a control program for a moving object that can perform movement control of the moving object by an appropriate information terminal.

SUMMARY

A first aspect of the present disclosure relates to a control device of a moving object, the control device including:

- a communication unit configured to communicate with an information terminal carried by a user of the moving object; and
- a controller configured to perform movement control of the moving object,
- in which when a predetermined operation from the user of the moving object is received,
- the controller transmits inquiry information on driver determination to the information terminals around the moving object,
- the controller receives predetermined answer information for the inquiry information,
- the controller selects an information terminal, which is a transmission source of the answer information that is received first, as a driver terminal, and
- the controller performs movement control of the moving object based on movement instruction information from the driver terminal.

A second aspect of the present disclosure relates to a control system including:

- an information terminal carried by a user of a moving object; and
- a control device including a communication unit configured to communicate with the information terminal and a controller configured to perform movement control of the moving object,
- in which when a predetermined operation from the user of the moving object is received,
- the control device transmits inquiry information on driver determination to the information terminals around the moving object,
- the control device receives predetermined answer information for the inquiry information,
- the control device selects an information terminal, which is a transmission source of the answer information that is received first, as a driver terminal, and
- the control device performs movement control of the moving object based on movement instruction information from the driver terminal.

A third aspect of the present disclosure relates to a control method performed by a control device including a communication unit configured to communicate with an information terminal carried by a user of a moving object and a controller configured to perform movement control of the moving object, the control method including,

- when a predetermined operation from the user of the moving object is received,
- transmitting inquiry information on driver determination to the information terminals around the moving object,
- receiving predetermined answer information for the inquiry information,
- selecting an information terminal, which is a transmission source of the answer information received first, as a driver terminal, and
- performing movement control of the moving object based on movement instruction information from the driver terminal.

According to the present disclosure, it is possible to provide a control device, a control system, a control method, and a recording medium storing a control program for a moving object that can perform movement control of the moving object by an appropriate information terminal.

BRIEF DESCRIPTION OF DRAWINGS

Exemplary embodiment(s) of the present invention will be described in detail based on the following figures, wherein:

FIG. 6 is a flowchart showing the parking-space-leaving instruction control of the vehicle performed by the smartphone;

DESCRIPTION OF EMBODIMENTS

Hereinafter, an embodiment of a control device of the present disclosure will be described with reference to the attached drawings. The drawings are to be viewed in directions of reference signs.

Figure 1:
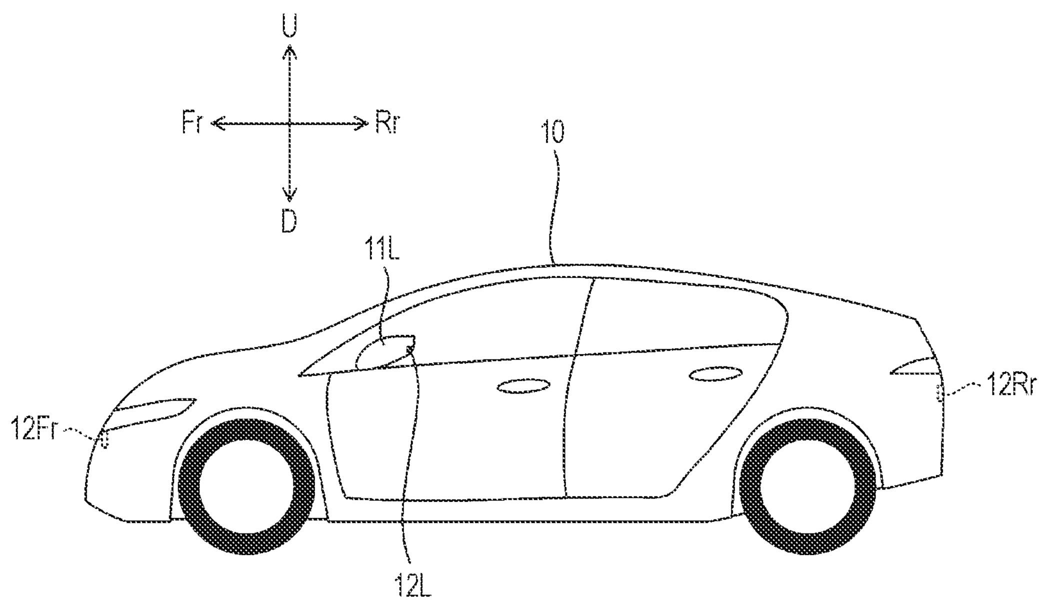
FIG. 1 is a side view showing an example of a vehicle mounted with a control device according to the present embodiment.
Figure 2:
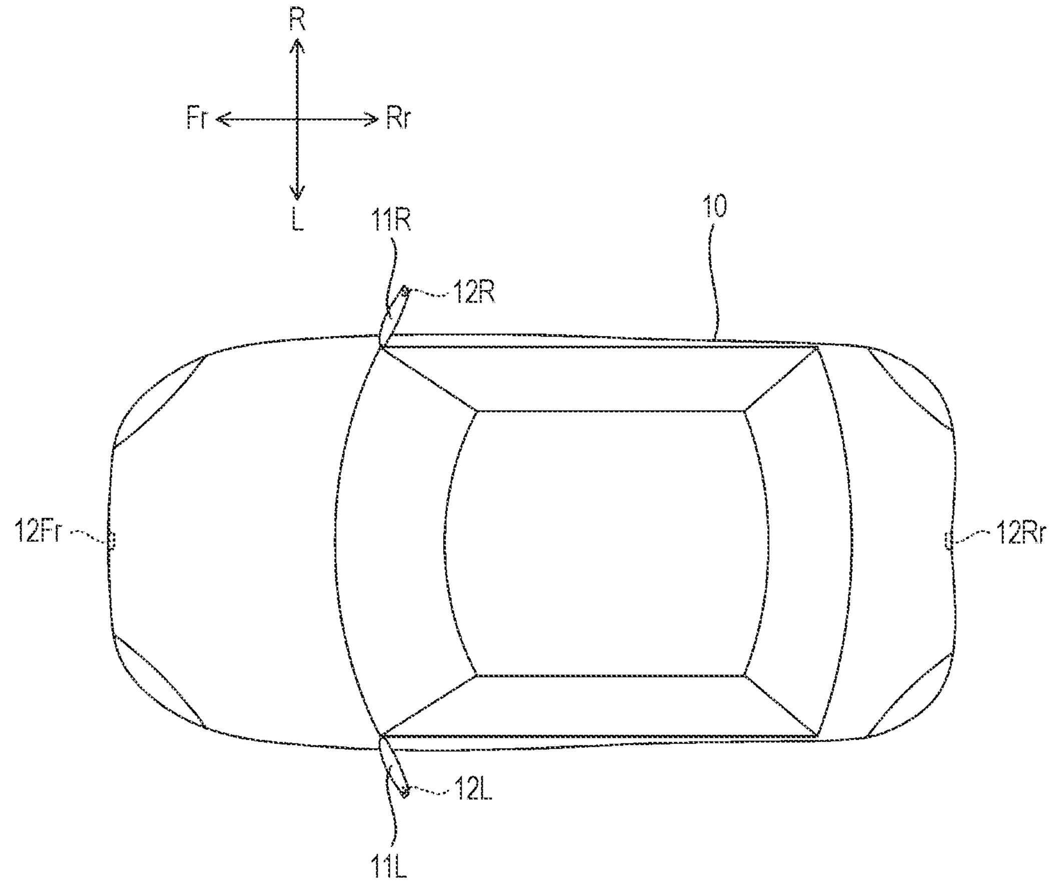
FIG. 2 is a top view of the vehicle shown in FIG. 1.

Further, in the present specification and the like, in order to simplify and clarify description, a front-rear direction, a left-right direction, and an upper-lower direction are described according to directions viewed from a driver of a vehicle 10 shown in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

Vehicle 10 Mounted with Control Device of Present Disclosure

FIG. 1 is a side view of the vehicle 10 mounted with a control device of the present disclosure. FIG. 2 is a top view of the vehicle 10 shown in FIG. 1. The vehicle 10 is an example of a moving object of the present disclosure.

The vehicle 10 is an automobile that includes a driving source (not shown), and wheels including driven wheels driven by power of the driving source and turning wheels that can be turned. In the present embodiment, the vehicle 10 is a four-wheel automobile including a pair of left and right front wheels and a pair of left and right rear wheels. The driving source of the vehicle 10 is, for example, an electric motor. The driving source of the vehicle 10 may be an internal combustion engine such as a gasoline engine or a diesel engine, or may be a combination of the electric motor and the internal combustion engine. Further, the driving source of the vehicle 10 may drive the pair of left and right front wheels, the pair of left and right rear wheels, or the four wheels including the pair of left and right front wheels and the pair of left and right rear wheels. Both the front wheels and the rear wheels may be the turning wheels that can be turned, or either one of the front wheels and the rear wheels may be the turning wheels that can be turned.

The vehicle 10 further includes side mirrors 11L and 11R. The side mirrors 11L and 11R are mirrors (rear-view mirrors) that are provided at outer sides of front seat doors of the vehicle 10 and that are for the driver to check a rear side and a rear lateral side. Each of the side mirrors 11L and 11R is fixed to a main body of the vehicle 10 by a rotation shaft that extends in a perpendicular direction, and can be opened and closed by rotating around the rotation shaft.

The vehicle 10 further includes a front camera 12Fr, a rear camera 12Rr, a left-side camera 12L, and a right-side camera 12R. The front camera 12Fr is a digital camera that is provided at a front portion of the vehicle 10 and that images a front side of the vehicle 10. The rear camera 12Rr is a digital camera that is provided at a rear portion of the vehicle 10 and that images a rear side of the vehicle 10. The left-side camera 12L is a digital camera that is provided at the left side mirror 11L of the vehicle 10, and that images a left side of the vehicle 10. The right-side camera 12R is a digital camera that is provided at the right side mirror 11R of the vehicle 10, and that images a right side of the vehicle 10.

Internal Configuration of Vehicle 10

Figure 3:
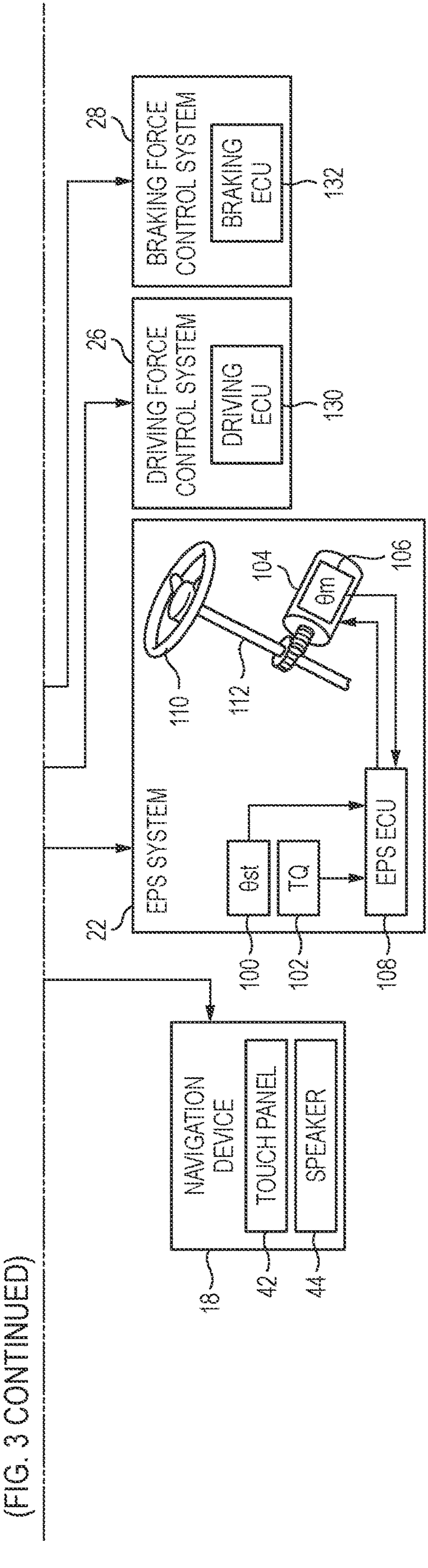
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28. The control ECU 20 is an example of the control device of the present disclosure.

The sensor group 16 acquires various detection values used for control performed by the control ECU 20. The sensor group 16 includes the front camera 12Fr, the rear camera 12Rr, the left-side camera 12L, and the right-side camera 12R. Further, the sensor group 16 includes a front sonar group 32_a_, a rear sonar group 32_b_, a left-side sonar group 32_c_, and a right-side sonar group 32_d_. Further, the sensor group 16 includes wheel sensors 34_a_ and 34_b_, a vehicle speed sensor 36, and an operation detection unit 38.

The front camera 12Fr, the rear camera 12Rr, the left-side camera 12L, and the right-side camera 12R acquire recognition data (for example, a surrounding image) for recognizing an outside of the vehicle 10 by imaging surroundings of the vehicle 10. Surrounding images captured by the front camera 12Fr, the rear camera 12Rr, the left-side camera 12L, and the right-side camera 12R are referred to as a front image, a rear image, a left-side image, and a right-side image, respectively. An image implemented by the left-side image and the right-side image may be referred to as a side image.

The front sonar group 32_a_, the rear sonar group 32_b_, the left-side sonar group 32_c_, and the right-side sonar group 32_d_ emit sound waves to the surroundings of the vehicle 10, and receive reflected sounds from other objects. The front sonar group 32_a_ includes, for example, four sonars. The sonars that constitute the front sonar group 32_a_ are provided on an obliquely left front side, a front left side, a front right side, and an obliquely right front side of the vehicle 10, respectively. The rear sonar group 32*b* includes, for example, four sonars. The sonars that constitute the rear sonar group 32*b* are provided on an obliquely left rear side, a rear left side, a rear right side, and an obliquely right rear side of the vehicle 10, respectively. The left-side sonar group 32*c* includes, for example, two sonars. The sonars that constitute the left-side sonar group 32*c* are provided on a left-side-portion front side and a left-side-portion rear side of the vehicle 10, respectively. The right-side sonar group 32*d* includes, for example, two sonars. The sonars that constitute the right-side sonar group 32*d* are provided on a right-side-portion front side and a right-side-portion rear side of the vehicle 10, respectively.

The wheel sensors 34*a* and 34*b* detect rotation angles of the wheels of the vehicle 10. The wheel sensors 34*a* and 34*b* may be implemented by angle sensors or displacement sensors. The wheel sensors 34*a* and 34*b* output detection pulses every time the wheels rotate at predetermined angles. The detection pulses output from the wheel sensors 34*a* and 34*b* are used for calculating the rotation angles of the wheels and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a transmission countershaft.

The operation detection unit 38 detects content of an operation performed by a user using an operation input unit 14, and outputs the detected content of the operation to the control ECU 20. The operation input unit 14 includes, for example, various user interfaces such as a side mirror switch for switching between an opened state and a closed state of the side mirrors 11L and 11R, and a shift lever (a select lever or a selector).

The navigation device 18 detects a current position of the vehicle 10 and guides the user to a route to a destination by using, for example, a global positioning system (GPS). The navigation device 18 includes a storage device (not shown) provided with a map information database.

The navigation device 18 includes a touch panel 42 and a speaker 44. The touch panel 42 functions as an input device and a display device of the control ECU 20. The speaker 44 outputs various pieces of guidance information by sound to the user of the vehicle 10.

The touch panel 42 is implemented such that various commands can be input to the control ECU 20. For example, the user can input a command related to movement support of the vehicle 10 via the touch panel 42. The movement support includes parking support and parking-space-leaving support of the vehicle 10. Further, the touch panel 42 is implemented such that various screens related to control content of the control ECU 20 are displayed. For example, a screen related to the movement support of the vehicle 10 is displayed on the touch panel 42. Specifically, a parking support button for requesting the parking support of the vehicle 10 and a parking-space-leaving support button for requesting the parking-space-leaving support of the vehicle 10 are displayed on the touch panel 42. The parking support button includes an automatic parking button for requesting parking by automatic steering of the control ECU 20 and an assistance parking button for requesting assistance when parking by an operation of the driver. The parking-space-leaving support button includes an automatic parking-space-leaving button for requesting parking-space-leaving by the automatic steering of the control ECU 20 and an assistance parking-space-leaving button for requesting assistance when performing the parking-space-leaving by the operation of the driver. Components other than the touch panel 42, for example, a smartphone or a tablet terminal may be used as an input device or a display device.

The control ECU 20 includes an input and output unit 50, a calculation unit 52, and a storage unit 54. The calculation unit 52 is implemented by, for example, a central processing unit (CPU). The calculation unit 52 performs various controls by controlling units based on a program stored in the storage unit 54. Further, the calculation unit 52 inputs and outputs a signal from and to units connected to the control ECU 20 via the input and output unit 50.

The calculation unit 52 includes an automatic parking control unit 55 that performs movement control of the vehicle 10. The automatic parking control unit 55 is an example of a control unit of the present disclosure.

The automatic parking control unit 55 performs automatic parking support and automatic parking-space-leaving support of the vehicle 10 by automatic steering in which an operation of a steering 110 is automatically performed under control of the automatic parking control unit 55. In the automatic parking support and the automatic parking-space-leaving support, an accelerator pedal (not shown), a brake pedal (not shown), and the operation input unit 14 are automatically operated. Further, the automatic parking control unit 55 performs the assistance parking support and the assistance parking-space-leaving support when the driver operates the accelerator pedal, the brake pedal, and the operation input unit 14 to manually park the vehicle 10 and manually cause the vehicle 10 to leave a parking space.

For example, based on the recognition data of the outside of the vehicle 10 acquired by the front camera 12Fr, the rear camera 12Rr, the left-side camera 12L, and the right-side camera 12R and a predetermined parking space designated by the user, the automatic parking control unit 55 controls automatic parking of parking the vehicle 10 in the designated predetermined parking space and automatic parking-space-leaving of causing the vehicle 10 to leave the predetermined parking space.

Specifically, when an operation for shifting to the automatic parking control or the automatic parking-space-leaving control is received from the user of the vehicle 10, the automatic parking control unit 55 transmits inquiry information necessary for determining a driver that performs an instruction operation of the automatic parking or the automatic parking-space-leaving to an information terminal around the vehicle 10. The automatic parking control unit 55 transmits the inquiry information to an information terminal in which an application for issuing a movement instruction of the vehicle 10 is activated by the user operation among information terminals around the vehicle 10. Further, the automatic parking control unit 55 receives predetermined answer information from the user for the inquiry information, and selects an information terminal that is a transmission source of the first received answer information as a driver terminal that executes instruction control. The automatic parking control unit 55 performs the movement control of the vehicle 10 based on movement instruction information from the driver terminal. Further, the automatic parking control unit 55 repeatedly transmits the inquiry information. When the first predetermined answer information is received, the automatic parking control unit 55 stops transmitting the inquiry information. Further, the automatic parking control unit 55 transmits a rejection response for rejecting signal reception to an information terminal other than the selected driver terminal.

The automatic parking control unit 55 registers the predetermined parking space designated by the user in the storage unit 54 as a designated parking space. Based on the recognition data of the outside of the vehicle 10 acquired by the front camera 12Fr, the rear camera 12Rr, the left-side camera 12L, and the right-side camera 12R, the automatic parking control unit 55 registers feature points related to the designated parking space in the storage unit 54. Based on the recognition data of the outside of the vehicle 10 and the feature points of the designated parking space designated by the user, the automatic parking control unit 55 controls automatic parking of parking the vehicle 10 in the designated parking space and automatic parking-space-leaving of causing the vehicle 10 to leave the designated parking space.

An EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 enables operation support of the steering 110 operated by an occupant and the automatic steering during the parking support by applying a driving force or a reaction force to a steering column 112 coupled to the steering 110. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication between the communication unit 24 and another communication device 120. The other communication device 120 is a base station, a communication device of another vehicle, a smartphone or a tablet terminal carried by the user of the vehicle 10, or the like. The communication unit 24 is an example of a communication unit of the present disclosure. The smartphone and the tablet terminal are examples of an information terminal of the present disclosure.

The driving force control system 26 includes a driving ECU 130. The driving force control system 26 executes driving force control of the vehicle 10. The driving ECU 130 controls a driving force of the vehicle 10 by controlling an engine (not shown) and the like based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a brake mechanism (not shown) and the like based on an operation performed by the user on the brake pedal (not shown).

Figure 4:
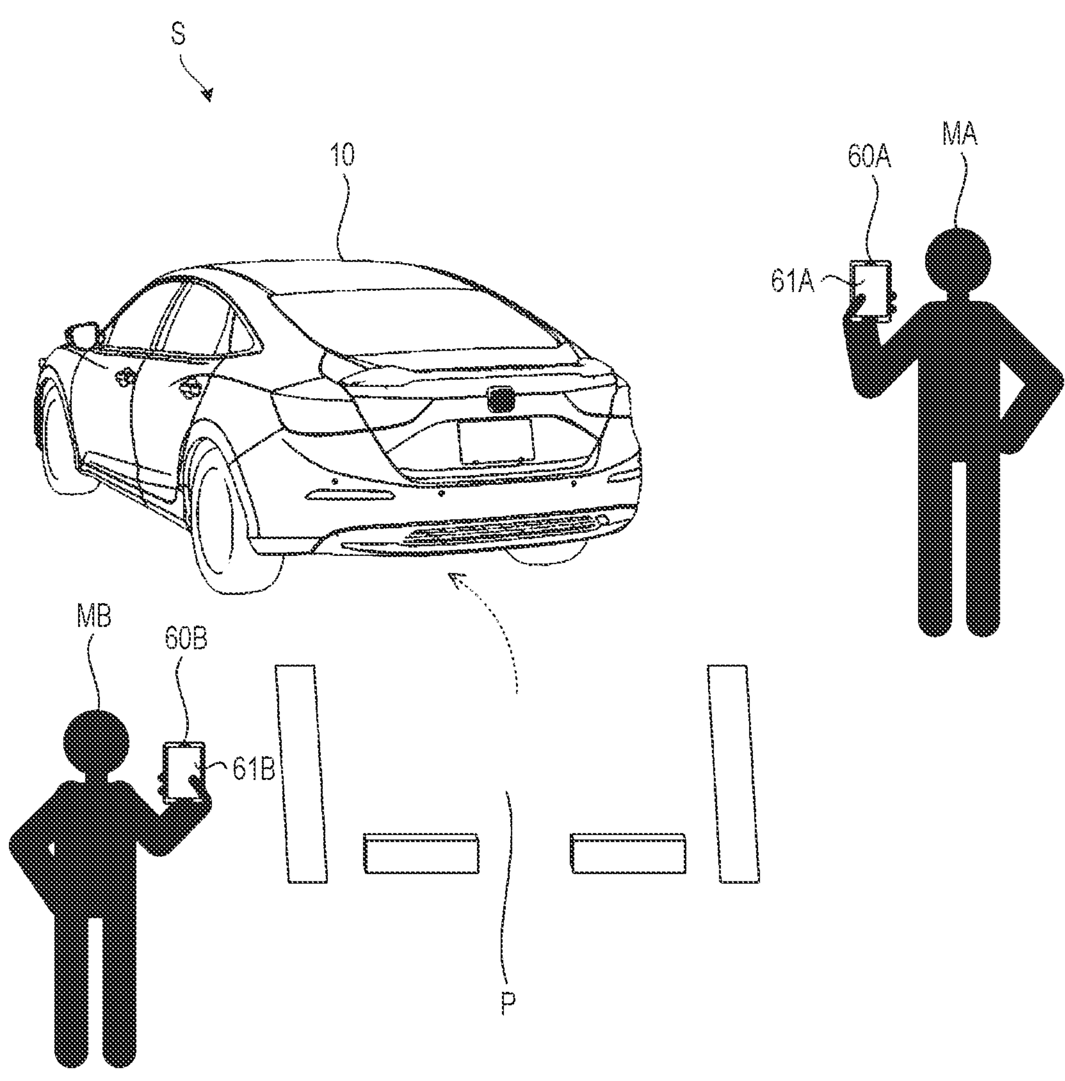
FIG. 4 is a diagram showing a state where the vehicle is under parking-space-leaving instruction control by using a smartphone from an outside of the vehicle.

FIG. 4 is a diagram showing an example of a state where a user MA, MB of the vehicle 10 performs movement instruction control of causing the vehicle 10 to automatically leave the parking space P by using a smartphone 60A carried by the user MA or a smartphone 60B carried by the user MB from the outside of the vehicle 10. The movement instruction control includes, for example, parking instruction control of automatically parking the vehicle 10 in the parking space P and parking-space-leaving instruction control of causing the vehicle 10 to automatically leave the parking space P. An example shown in FIG. 4 shows a state where the vehicle 10 is under the parking-space-leaving instruction control.

An application for issuing the movement instruction of the vehicle 10 is pre-installed in the smartphone 60A, 60B. When smartphone screens 61A and 61B of the smartphones 60A and 60B are respectively touched by the users MA and MB, the smartphones 60A and 60B transmit instruction signals for instructing the automatic parking-space-leaving of the vehicle 10 to the vehicle 10 by the wireless communication. For example, Bluetooth Low Energy (BLE: registered trademark) is used as the wireless communication. The vehicle 10 receives the instruction signals transmitted from the smartphones 60A and 60B through the communication unit 24. The automatic parking control unit 55 of the vehicle 10 controls the automatic parking-space-leaving of the vehicle 10 according to the instruction signals received through the communication unit 24.

Movement Control Performed by Automatic Parking Control Unit 55

Next, the movement control of the vehicle 10 performed by the automatic parking control unit 55 of the control ECU 20 will be described with reference to FIG. 5.

Figure 5:
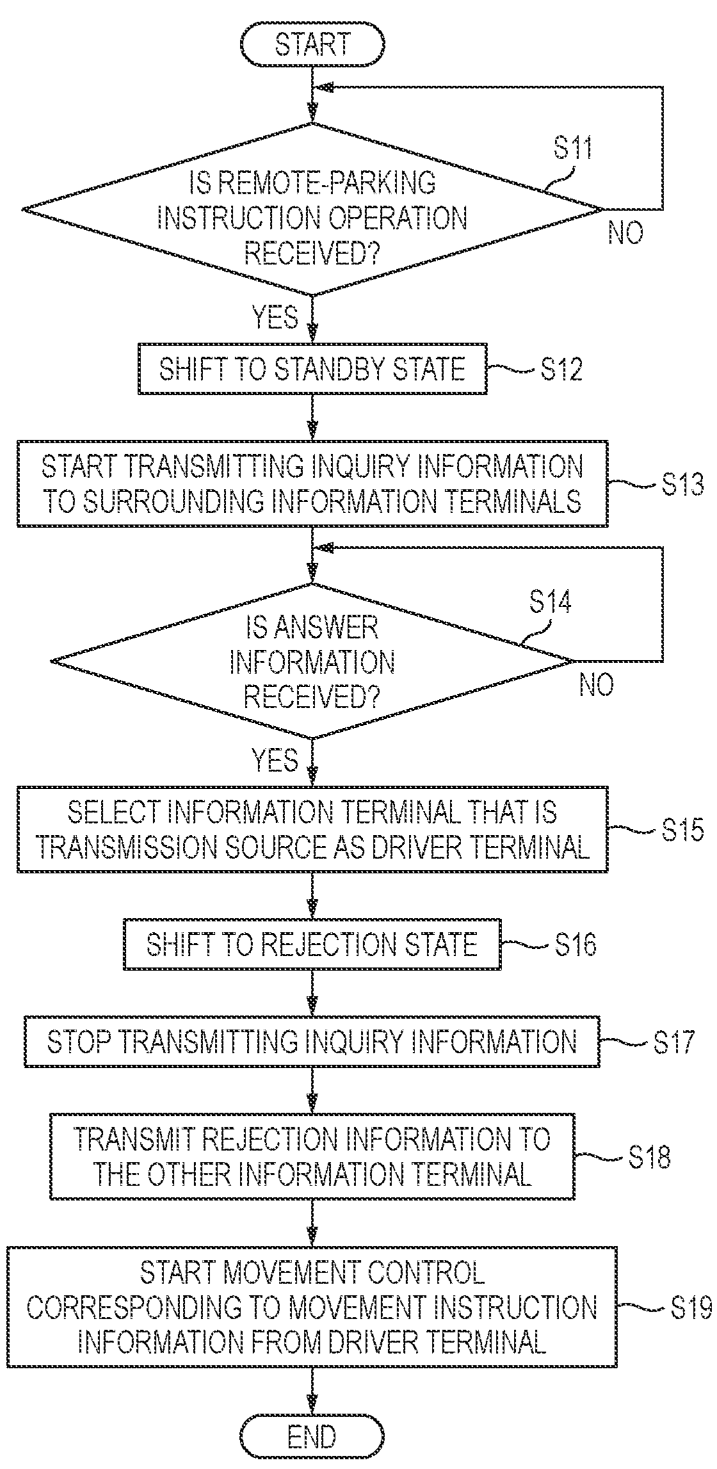
FIG. 5 is a flowchart showing automatic parking-space-leaving control of the vehicle performed by an automatic parking control unit.

FIG. 5 is a flowchart showing the automatic parking-space-leaving control of the vehicle 10 performed by the automatic parking control unit 55 of the control ECU 20. The automatic parking-space-leaving control is executed in, for example, a situation as shown in FIG. 4 in which the user M (MA, MB) attempts to cause the vehicle 10 to automatically leave the parking space P by using the smartphone 60 (60A, 60B).

First, the automatic parking control unit 55 determines whether a remote-parking instruction operation is received (step S11). The remote-parking instruction operation is an operation for making a state of the vehicle 10 into a state where the parking-space-leaving is possible by the automatic parking-space-leaving control. The instruction operation is received by the user M touching the automatic parking-space-leaving button (not shown) in the vehicle 10. For example, the automatic parking-space-leaving button may be provided as a touch button displayed on the touch panel 42 of the navigation device 18, or may be provided as a mechanical vehicle switch or the like.

In step S11, when the remote-parking instruction operation is not received (step S11: No), the automatic parking control unit 55 waits until the remote-parking instruction operation is received.

In step S11, when the remote-parking instruction operation is received (step S11: Yes), the automatic parking control unit 55 shifts to a standby state where a signal from the external smartphone 60 can be received (step S12). Accordingly, for example, the automatic parking control unit 55 is in a state where the signals from the smartphones 60A and 60B of the users MA and MB outside the vehicle 10 can be received. Therefore, a state is established in which the users MA and MB using the smartphones 60A and 60B to cause the vehicle 10 to automatically leave the parking space is possible.

Next, the automatic parking control unit 55 starts transmitting inquiry information on the automatic parking-space-leaving to the smartphone 60 (information terminal) of the user M around the vehicle 10 (step S13). The smartphone 60 around the vehicle 10 is, for example, a smartphone in a state where communication quality between the smartphone 60 and the communication unit 24 of the vehicle 10 is equal to or higher than a certain level. Specifically, the smartphone 60 is a smartphone carried by the user M who is within 5 to 10 m of the vehicle 10. The inquiry information on the automatic parking-space-leaving is, for example, information inquiring of the user M whether the user M accepts precaution specified regarding the automatic parking-space-leaving. Alternatively, the inquiry information may be, for example, information simply inquiring whether to execute the automatic parking-space-leaving.

Next, the automatic parking control unit 55 determines whether answer information from the smartphone 60 for the inquiry information transmitted in step S13 is received (step S14). The answer information is, for example, information on an answer that the user M accepts the inquired precaution related to the automatic parking-space-leaving. Alternatively, the answer information may simply be information on an answer that the automatic parking-space-leaving is to be executed.

In step S14, when the answer information is not received (step S14: No), the automatic parking control unit 55 waits until the answer information is received.

In step S14, when the answer information is received (step S14: Yes), the automatic parking control unit 55 selects the smartphone 60 that is a transmission source that has transmitted the answer information as the driver terminal (step S15). The smartphone 60 that is the transmission source that has transmitted the answer information is the smartphone 60 that is a transmission source of a first received answer information after the automatic parking control unit 55 transmits the inquiry information. The driver terminal is the smartphone 60 for which the automatic parking-space-leaving control of the vehicle 10 is permitted. Here, in the following description, it is assumed that the smartphone 60A carried by the user MA is selected as the driver terminal.

Next, the automatic parking control unit 55 shifts to a rejection state, and is in a state of rejecting to respond to a signal from a terminal other than the driver terminal selected in step S15, that is, the smartphone 60 other than the smartphone 60A of the user MA (step S16). Accordingly, for example, the automatic parking control unit 55 is in a state of rejecting to respond to a signal from the smartphone 60B carried by the user MB between the users MA and MB outside the vehicle 10. Therefore, the user MB is in a state of being incapable of causing the vehicle 10 to automatically leave the parking space by using the smartphone 60B.

The automatic parking control unit 55 stops transmitting the inquiry information on the automatic parking-space-leaving to the smartphone 60 of the user M around the vehicle 10, which is started in step S13 (step S17). That is, since the smartphone 60A is determined as the driver terminal that controls the automatic parking-space-leaving of the vehicle 10, the automatic parking control unit 55 stops transmitting the inquiry information on the automatic parking-space-leaving.

The automatic parking control unit 55 transmits rejection information notifying that the signal from the smartphone 60B is not received to the smartphone 60 not selected as the driver terminal, for example, the smartphone 60B of the user MB (step S18). That is, since the user M (smartphone 60) who can control the automatic parking-space-leaving of the vehicle 10 is determined, the smartphone 60B of the user MB notifies the user MB (smartphone 60B) that the automatic parking-space-leaving of the vehicle 10 cannot be performed.

Next, the automatic parking control unit 55 starts controlling the automatic parking-space-leaving of the vehicle 10 according to the movement instruction information transmitted from the driver terminal, that is, a signal for instructing the automatic parking-space-leaving of the vehicle 10 transmitted from the smartphone 60A carried by the user MA (step S19).

As described above, when the remote-parking instruction operation from the user M of the vehicle 10 is received, the automatic parking control unit 55 of the control ECU 20 transmits, to the smartphone 60 of the user M around the vehicle 10, the inquiry information indicating whether the user accepts the precaution for determining the driver that performs the instruction control of the vehicle 10, and receives the information on an acceptance answer to the inquiry information from the smartphone 60. In this case, the automatic parking control unit 55 selects the smartphone 60 that is the transmission source of the first received acceptance answer information as the driver terminal that performs the automatic parking-space-leaving of the vehicle 10, and controls the automatic parking-space-leaving of the vehicle 10 based on the movement instruction information from the driver terminal. Accordingly, even if there are a plurality of users M who desire to perform the instruction operation of the automatic parking-space-leaving of the vehicle 10, it is possible to prevent movement instructions from the plurality of users M from competing with each other. Therefore, it is possible to prevent confusion of the users M due to the plurality of users M performing the automatic parking-space-leaving of the vehicle 10 in parallel. Further, it is possible to prevent interference and a processing load of the control ECU 20 due to bidirectional communication between the plurality of smartphones 60 and the control ECU 20. Further, the movement control of the vehicle 10 can be performed based on the movement instruction from the user M who gives the answer accepting the inquiry about the driver determination, that is, the appropriate user M who performs the instruction control of the automatic parking-space-leaving of the vehicle 10.

The smartphone 60 around the vehicle 10 is a smartphone in which the communication quality between the smartphone 60 and the communication unit 24 of the vehicle 10 is equal to or higher than a certain level in the control ECU 20. Accordingly, the smartphone 60 in which communication during the movement control of the vehicle 10 is stable can be set as the driver terminal. Further, the user M who is near the vehicle 10 and is easy to directly check a situation of the vehicle 10 can be set as the instruction driver (the user M of the driver terminal).

The automatic parking control unit 55 of the control ECU 20 repeatedly transmits the inquiry information to the smartphones 60 around the vehicle 10, receives the first answer accepting the inquiry, selects the smartphone 60 that gives the acceptance answer as the driver terminal, and then stops transmitting the inquiry information to the smartphone 60. Accordingly, since the transmission of the inquiry information is stopped after the driver terminal is selected, for the user M who carries the smartphone 60 other than the driver terminal, it is possible to prevent inconvenience of unnecessary inquiry information being transmitted, and usability is improved.

After the driver terminal is determined, the automatic parking control unit 55 of the control ECU 20 does not receive the signal from the smartphone 60 other than the driver terminal between the smartphones 60 around the vehicle 10, and transmits the rejection response notifying that the signal is not received. Accordingly, the user M of the smartphone 60 other than the driver terminal can recognize that the other user M serves as the instruction driver that issues the parking-space-leaving instruction of the vehicle 10, so that the usability is improved.

In the control ECU 20, the inquiry information to be transmitted to the surrounding smartphones 60 is the information for causing the smartphone 60 in which the application for issuing the movement instruction of the vehicle 10 is activated by the user operation between the smartphones 60 around the vehicle 10 to execute the inquiry about the driver determination. Accordingly, the inquiry about the driver determination is made only to the user M who activates the application for issuing the movement instruction of the vehicle 10. Therefore, it is possible to prevent the inquiry about the driver determination from being made to the user M who does not intend to issue the movement instruction of the vehicle 10, and the usability is improved.

In steps S15 and S16 in the flowchart of FIG. 5 described above, after the predetermined smartphone 60 is selected as the driver terminal, the automatic parking control unit 55 immediately shifts to the rejection state, but the present disclosure is not limited thereto. For example, after the predetermined smartphone 60 is selected as the driver terminal, the automatic parking control unit 55 may transmit a "driver notification" notifying that the predetermined smartphone 60 is selected as the driver terminal to the selected smartphone 60. Accordingly, the user M can easily recognize that the user M serves as the instruction driver that performs the instruction operation of the automatic parking-space-leaving of the vehicle 10, and the usability is improved.

In the control example of the automatic parking-space-leaving described above, a case has been described in which the inquiry information on the automatic parking-space-leaving is transmitted to the smartphone in the state where the communication quality between the smartphone and the communication unit 24 of the vehicle 10 is equal to or higher than a certain level, but the present disclosure is not limited thereto. The automatic parking control unit 55 may transmit the inquiry information on the automatic parking-space-leaving to, for example, all the smartphones 60 to which radio waves reach without designating a transmission destination.

Movement Instruction Control of Vehicle 10 Performed by Smartphone 60

Next, an example of movement instruction control of the vehicle 10 performed by the smartphone 60 will be described with reference to FIGS. 6 to 8.

FIG. 6 is a flowchart showing the parking-space-leaving instruction control of the vehicle 10 performed by the smartphone 60. FIGS. 7 and 8 are diagrams showing examples of an image displayed on the smartphone screen 61 of the smartphone 60 that can issue the parking-space-leaving instruction of the vehicle 10. The parking-space-leaving instruction control is executed in, for example, the situation as shown in FIG. 4 in which the user M (MA, MB) attempts to cause the vehicle 10 to automatically leave the parking space P by using the smartphone 60 (60A, 60B).

Processing shown in FIG. 6 is processing performed by an application that is installed in the smartphone 60 and that is for issuing the movement instruction of the vehicle 10. The application is activated when, for example, the automatic parking-space-leaving button (not shown) displayed on the smartphone screen 61 is touched.

First, the smartphone 60 determines whether an activation operation of the application of the vehicle 10 is received (step S21).

In step S21, when the activation operation of the application is not received (step S21: No), the smartphone 60 repeats the processing of step S21 and waits until the activation operation of the application is received.

In step S21, when the activation operation of the application is received (step S21: Yes), the smartphone 60 determines whether the inquiry information on the automatic parking-space-leaving is received from the automatic parking control unit 55 of the vehicle 10 (step S22). The inquiry information on the automatic parking-space-leaving is information received by the smartphone 60 in which the application for issuing the movement instruction of the vehicle 10 is activated.

In step S22, when the inquiry information on the automatic parking-space-leaving is received (step S22: Yes), the smartphone 60 displays the precaution (disclaimer) specified regarding the automatic parking-space-leaving on the smartphone screen 61 (step S23).

Figure 7:
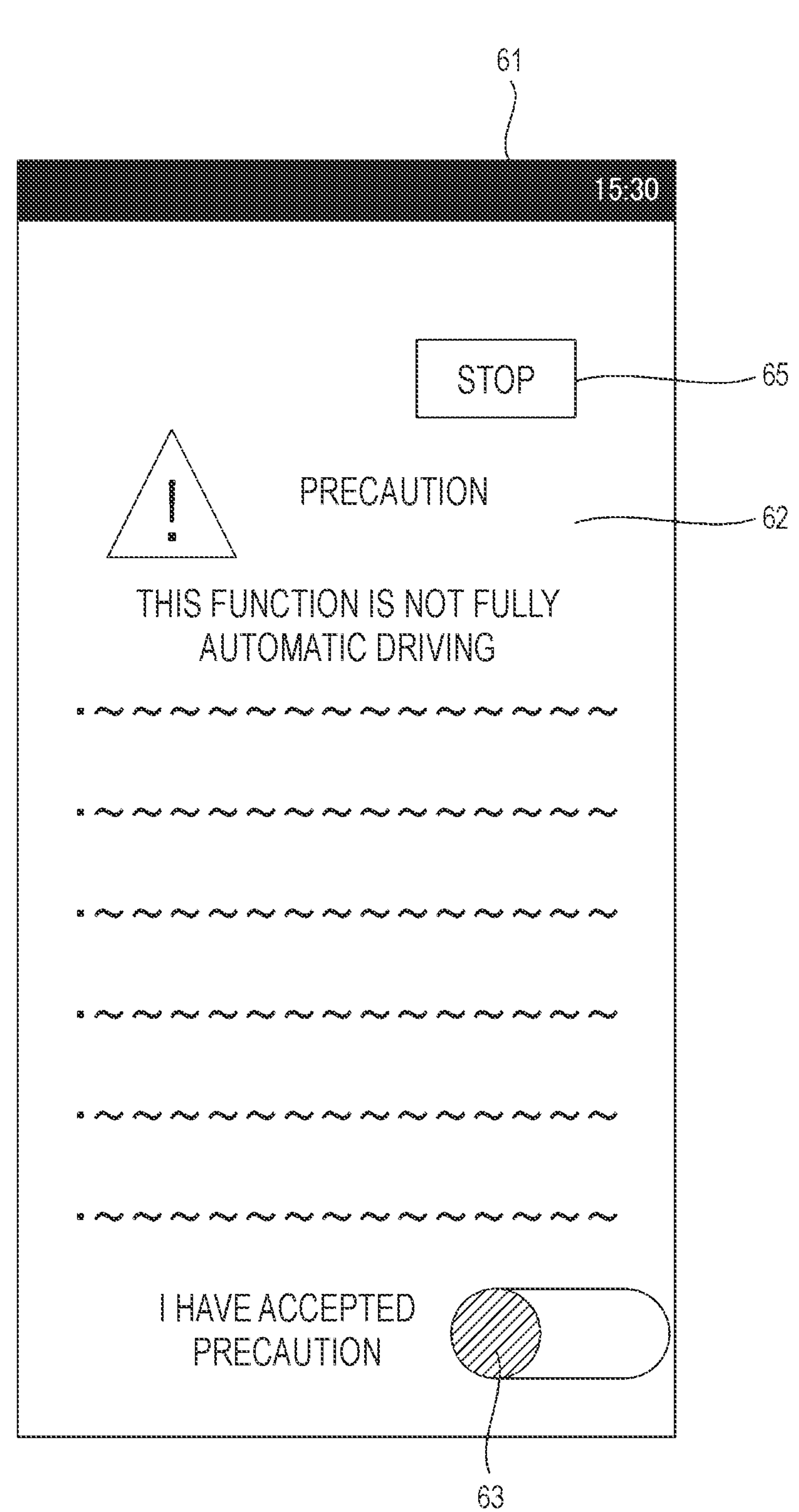
FIG. 7 is a diagram showing an example of an image displayed on a smartphone that can issue a parking-space-leaving instruction of the vehicle.

For example, FIG. 7 is a diagram showing an example of the disclaimer displayed on the smartphone screen 61 of the smartphone 60 that receives the inquiry information on the automatic parking-space-leaving. As shown in FIG. 7, the smartphone screen 61 displays a disclaimer 62 such as "precaution: this function is not fully automatic driving". The displayed disclaimer includes display of an acceptance button 63 operated by the user M when the user M accepts the precaution. When the user M swipes the acceptance button 63, a sentence such as "I have accepted precaution" indicating that the user M has accepted the precaution is displayed.

Next, the smartphone 60 determines whether the acceptance button 63 displayed in step S23 receives the acceptance operation (for example, the swiping operation) from the user M (step S24).

In step S24, when the acceptance operation is not received from the user M (step S24: No), the smartphone 60 repeats the processing of step S24 and waits until the acceptance operation is received from the user M.

In step S24, when the acceptance operation is received from the user M (step S24: Yes), the smartphone 60 transmits, to the vehicle 10, acceptance answer information indicating that the user M accepts the precaution (step S25). When the acceptance answer information is transmitted to the vehicle 10, the smartphone 60 that is a transmission source of the acceptance answer information is determined on a vehicle 10 side as the driver terminal that performs the parking-space-leaving instruction control of the vehicle 10.

Next, the smartphone 60 displays a movement operation screen touched by the user M on the smartphone screen 61 in order to perform the parking-space-leaving instruction control of the vehicle 10 (step S26).

Next, the smartphone 60 determines whether the movement operation screen displayed in step S26 receives a movement operation for moving the vehicle 10 from the user M (step S27).

In step S27, when the movement operation is not received from the user M (step S27: No), the smartphone 60 repeats the processing of step S27 and waits until the movement operation is received from the user M.

In step S27, when the movement operation is received from the user M (step S27: Yes), the smartphone 60 transmits the movement instruction information corresponding to the movement operation to the vehicle 10 (step S28). When the movement instruction information is transmitted to the vehicle 10, the automatic parking control unit 55 of the vehicle 10 controls the automatic parking-space-leaving of the vehicle 10 based on the movement instruction information.

Next, the smartphone 60 determines whether movement (automatic parking-space-leaving) of the vehicle 10 is completed (step S29). A fact that the automatic parking-space-leaving of the vehicle 10 is completed can be recognized by, for example, an automatic parking-space-leaving completion signal transmitted from the automatic parking control unit 55 of the vehicle 10 to the smartphone 60.

In step S29, when the automatic parking-space-leaving of the vehicle 10 is not completed (step S29: No), the smartphone 60 returns to step S27, and repeatedly executes processing.

In step S29, when the automatic parking-space-leaving of the vehicle 10 is completed (step S29: Yes), the smartphone 60 ends the processing of the parking-space-leaving instruction control.

In contrast, in step S22, when the inquiry information on the automatic parking-space-leaving is not received (step S22: No), the smartphone 60 determines whether the rejection information is received from the automatic parking control unit 55 of the vehicle 10 (step S30). As described in step S18 of FIG. 5, the rejection information is information transmitted to the smartphone 60 other than the smartphone 60 selected as the driver terminal, that is, the smartphone 60 whose parking-space-leaving instruction is rejected.

In step S30, when the rejection information is not received (step S30: No), the smartphone 60 returns to step S22, and repeats processing.

In step S30, when the rejection information is received (step S30: Yes), the smartphone 60 displays the rejection information notifying that the smartphone 60 is not selected as the driver terminal on the smartphone screen 61 (step S31), and ends the parking-space-leaving instruction control.

Figure 8:
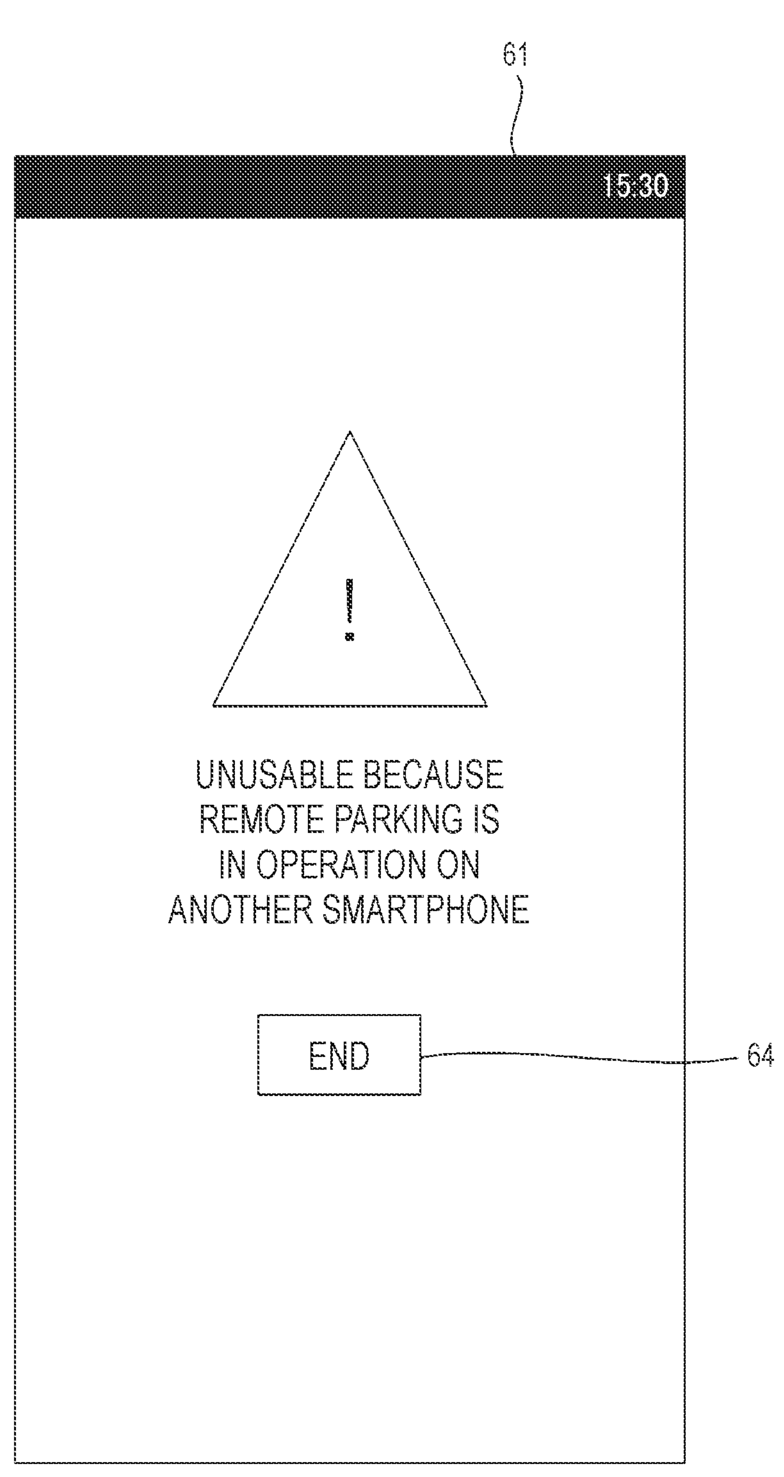
FIG. 8 is a diagram showing an example of an image displayed on a smartphone for which the parking-space-leaving instruction of the vehicle is rejected.

For example, FIG. 8 is a diagram showing an example of the rejection information displayed on the smartphone screen 61 of the smartphone 60 whose parking-space-leaving instruction is rejected. As shown in FIG. 8, the smartphone screen 61 displays information for rejecting the parking-space-leaving instruction such as "unusable because remote parking is in operation on another smartphone". When the rejection information is displayed in this way, for example, in a case where an end button 64 displayed on the smartphone screen 61 is touched by the user M, the parking-space-leaving instruction control is also ended.

As described above, the smartphone 60 is implemented to receive the inquiry information on the automatic parking-space-leaving from the vehicle 10 only when the application that issues the movement instruction of the vehicle 10 is activated by the user M. Therefore, unnecessary information cannot be transmitted to the user M who does not intend to issue the movement instruction of the vehicle 10, and the usability is improved.

In step S24 in the flowchart of FIG. 6, when the acceptance operation is not received from the user M, the smartphone 60 waits until the acceptance operation is received, but the present disclosure is not limited thereto. For example, during the wait, when a stop operation of the parking-space-leaving instruction is performed by the user M, the smartphone 60 may end the parking-space-leaving instruction control without waiting for the reception of the acceptance operation. Specifically, as shown in FIG. 7, a stop button 65 may be displayed on the smartphone screen 61 together with the display of the disclaimer 62, and the parking-space-leaving instruction control may be ended when the user M touches the stop button 65. Accordingly, for example, when the disclaimer 62 is not accepted, the user M can easily exit from the parking-space-leaving instruction operation, and the usability is improved.

In step S25 in the flowchart of FIG. 6, the smartphone 60 displays the movement operation screen in step S26 after the acceptance answer information is transmitted, but, for example, the smartphone 60 may wait for notification of a driver selection result from the vehicle 10 after the acceptance answer information is transmitted. That is, in step S15 in the flowchart of FIG. 5, a predetermined smartphone 60 may wait for the "driver notification" transmitted when the predetermined smartphone 60 is selected as the driver terminal, and may display the movement operation screen in step S26 after the driver notification is received. Further when the "driver notification" is not transmitted as the driver selection result from the vehicle 10 and the "rejection information" is transmitted, the smartphone 60 may end the processing of the parking-space-leaving instruction control after the rejection information notifying that the smartphone 60 is not selected as the driver terminal is displayed, which is similar to that of step S31.

Operation of Control System

Next, an operation example of a control system S (see FIG. 4) implemented by the vehicle 10 that controls the automatic parking-space-leaving and the smartphones 60A and 60B that control the parking-space-leaving instruction will be described with reference to FIGS. 9 and 10.

First Operation Example

Figure 9:
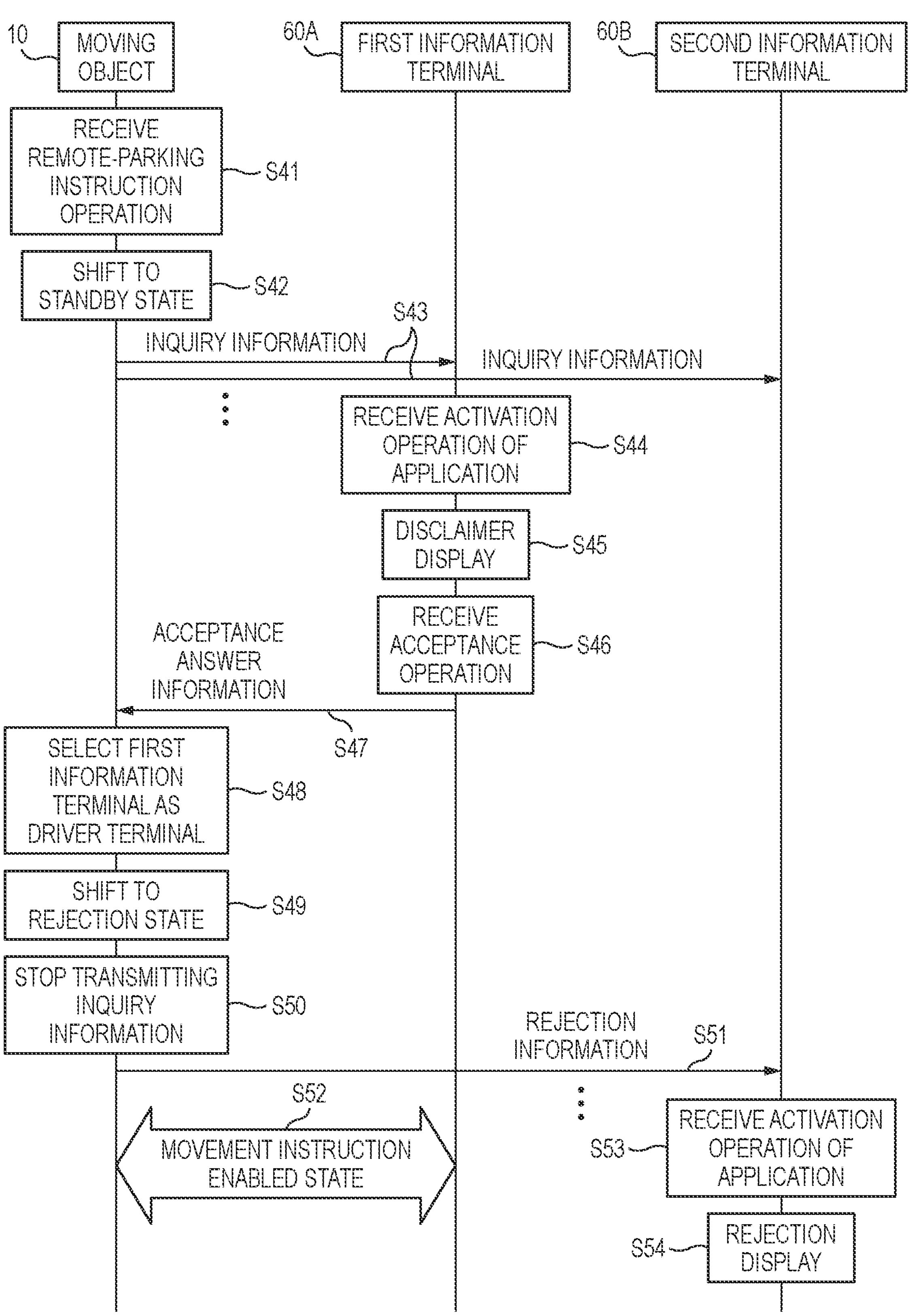
FIG. 9 is a sequence diagram showing a first operation example of a control system.

FIG. 9 is a sequence diagram showing a first operation example of the control system S. First, the vehicle (moving object) 10 receives, from the user M, the remote-parking instruction operation for causing the vehicle 10 parked in the parking space P to leave the parking space P under the automatic parking-space-leaving control (step S41). The vehicle 10 shifts to the standby state where a signal from the smartphone (information terminal) 60 can be received (step S42). The vehicle 10 transmits the inquiry information on the automatic parking-space-leaving to the smartphone (first information terminal) 60A and the smartphone (second information terminal) 60B carried by the users M around the vehicle 10 (step S43).

The smartphone 60A receives an activation operation of the user MA who activates the application for issuing the movement instruction of the vehicle 10 (step S44). The smartphone 60A displays the disclaimer (the precaution specified regarding the automatic parking-space-leaving) 62 on the smartphone screen 61A (step S45). The smartphone 60A receives an acceptance operation of the user MA who accepts the disclaimer 62 (step S46). The smartphone 60A transmits, to the vehicle 10, acceptance answer information of the user MA who accepts the disclaimer 62 (step S47).

The vehicle 10 selects, as the driver terminal, the smartphone 60A that is a transmission source that has transmitted the acceptance answer information (step S48). The vehicle 10 shifts to the rejection state of rejecting a signal from the smartphone 60B for the smartphone 60B of the user MB other than the smartphone 60A of the user MA selected as the driver terminal (step S49). The vehicle 10 stops transmitting the inquiry information on the automatic parking-space-leaving to the smartphone 60B (step S50). The vehicle 10 transmits rejection information notifying that the signal from the smartphone 60B is not received to the smartphone 60B not selected as the driver terminal (step S51). Accordingly, a movement instruction enabled state is established in which the automatic parking-space-leaving of the vehicle 10 can be under the parking-space-leaving instruction control by the smartphone 60A (step S52).

For example, it is assumed that, after the rejection information is transmitted from the vehicle 10 to the smartphone 60B, the smartphone 60B receives an activation operation of the user MB who activates the application for issuing the movement instruction of the vehicle 10 (step S53). The smartphone 60B displays the rejection information notifying that the smartphone 60B is not selected as the driver terminal on the smartphone screen 61B (step S54).

As described above, according to the first operation example of the control system S, when the inquiry information on the automatic parking-space-leaving is transmitted from the vehicle 10 to the smartphones 60A and 60B, the disclaimer 62 is displayed only on the smartphone on which the activation operation of the application is performed, that is, the smartphone 60A in the present example. When the acceptance answer information is transmitted from the smartphone 60A to the vehicle 10 before the application of the smartphone 60B is activated, for example, even if the application is not activated in the smartphone 60B, the smartphone 60A is selected as the driver terminal. In this case, when the application of the smartphone 60B is activated thereafter, the rejection information is displayed on the smartphone 60B without displaying the disclaimer 62. Therefore, inconvenience that unnecessary inquiry information is transmitted to the smartphone 60B not selected as the driver terminal is prevented, and the usability is improved.

Second Operation Example

Figure 10:
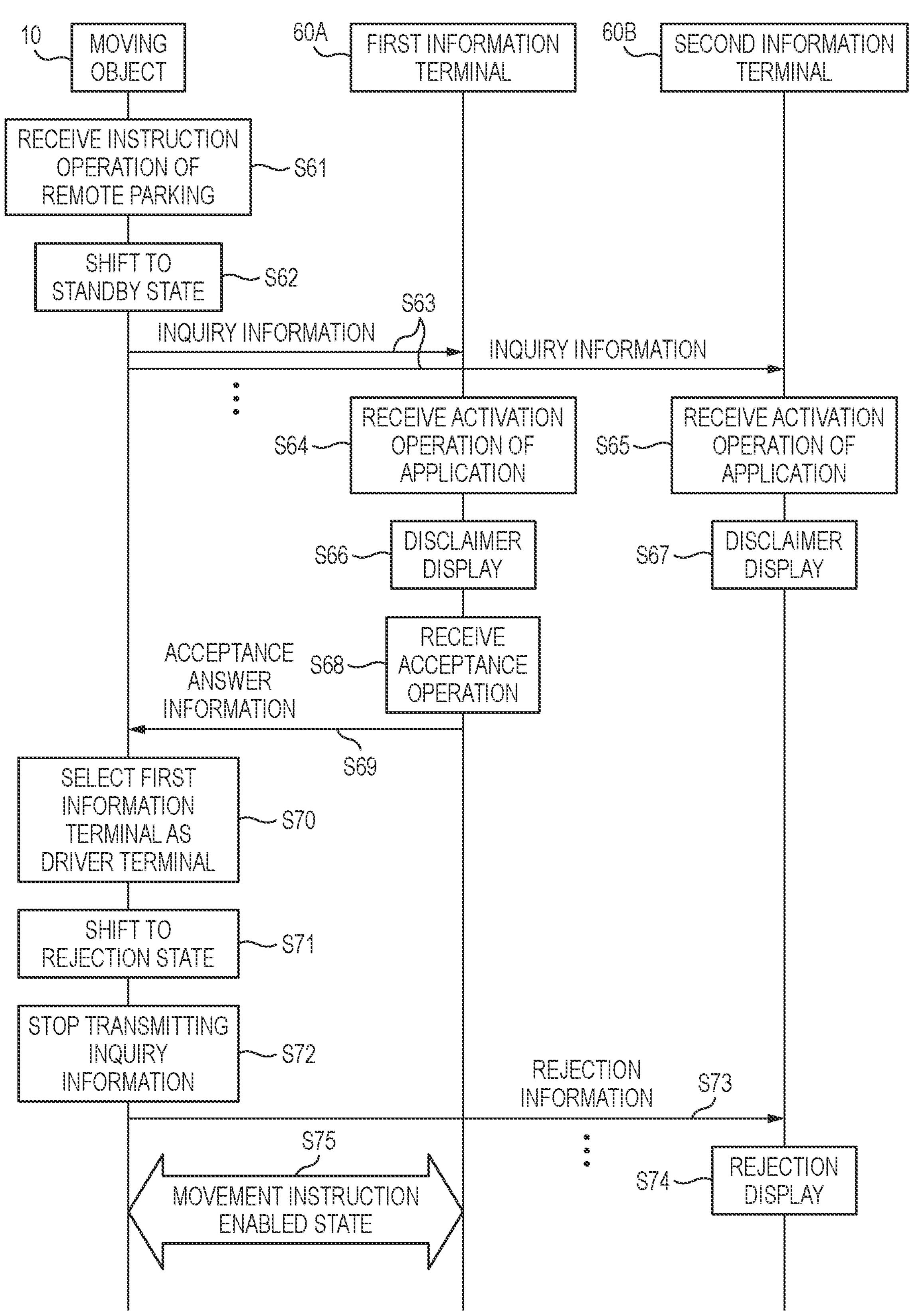
FIG. 10 is a sequence diagram showing a second operation example of the control system.

FIG. 10 is a sequence diagram showing a second operation example of the control system S. First, the vehicle (moving object) 10 receives, from the user M, the remote-parking instruction operation for causing the vehicle 10 parked in the parking space P to leave the parking space P under the automatic parking-space-leaving control (step S61). The vehicle 10 shifts to the standby state where a signal from the smartphone (information terminal) 60 can be received (step S62). The vehicle 10 transmits the inquiry information on the automatic parking-space-leaving to the smartphone (first information terminal) 60A and the smartphone (second information terminal) 60B carried by the users M around the vehicle 10 (step S63).

The smartphone 60A receives an activation operation of the user MA who activates the application for issuing the movement instruction of the vehicle 10 (step S64). The smartphone 60B receives an activation operation of the user MB who activates the application for issuing the movement instruction of the vehicle 10 (step S65).

The smartphone 60A displays the disclaimer (the precaution specified regarding the automatic parking-space-leaving) 62 on the smartphone screen 61A (step S66). The smartphone 60B displays the disclaimer 62 on the smartphone screen 61B (step S67).

The smartphone 60A receives an acceptance operation of the user MA who accepts the disclaimer 62 (step S68). The smartphone 60A transmits, to the vehicle 10, acceptance answer information of the user MA who accepts the disclaimer 62 (step S69).

The vehicle 10 selects, as the driver terminal, the smartphone 60A that is a transmission source that has transmitted the acceptance answer information (step S70). The vehicle 10 shifts to the rejection state of rejecting a signal from the smartphone 60B for the smartphone 60B of the user MB other than the smartphone 60A of the user MA selected as the driver terminal (step S71). The vehicle 10 stops transmitting the inquiry information on the automatic parking-space-leaving to the smartphone 60B (step S72). The vehicle 10 transmits rejection information notifying that the signal from the smartphone 60B is not received to the smartphone 60B not selected as the driver terminal (step S73).

The smartphone 60B displays the rejection information notifying that the smartphone 60B is not selected as the driver terminal on the smartphone screens 61 (step S74).

The smartphone 60A is in the movement instruction enabled state where the automatic parking-space-leaving of the vehicle 10 can be under the parking-space-leaving instruction control with the vehicle 10 (step S75).

As described above, according to the second operation example of the control system S, after the inquiry information on the automatic parking-space-leaving is transmitted from the vehicle 10 to the smartphones 60A and 60B, in the state where the driver terminal is still not selected, the disclaimer 62 is displayed on the smartphones on each of which the activation operation of the application is performed, that is, both the smartphones 60A and 60B in the present example. For example, when the acceptance answer information is first transmitted from the smartphone 60A to the vehicle 10, the smartphone 60A is selected as the driver terminal, and the rejection information is transmitted to the smartphone 60B. Therefore, since the user MB of the smartphone 60B other than the driver terminal can recognize that the other user has already become the instruction driver that issues the parking-space-leaving instruction of the vehicle 10, the usability is improved.

Modification of Movement Control Performed by Automatic Parking Control Unit 55

Next, a modification of the movement control of the vehicle 10 performed by the automatic parking control unit 55 of the control ECU 20 will be described.

First Modification

In the movement control performed by the automatic parking control unit 55 described above, the automatic parking-space-leaving control of the vehicle 10 has been described, but for example, when manual parking-space-leaving of the vehicle 10 by a manual operation of the user M is started, control is performed as follows. When the manual parking-space-leaving of the vehicle 10 is performed by the manual operation of the user M, the automatic parking control unit 55 of the vehicle 10 sets a prohibition state where the parking-space-leaving instruction control by the instruction operation from the external smartphone 60 is prohibited. The automatic parking control unit 55 notifies the smartphone 60 whose communication quality with the vehicle 10 is equal to or higher than a certain level or the smartphone 60 having a predetermined distance (for example, within 5 to 10 m) from the vehicle 10 that the parking-space-leaving instruction control by the instruction operation is prohibited. Accordingly, during the manual parking-space-leaving performed by the user M, it is possible to prevent the parking-space-leaving instruction from the smartphone 60 from being received. Further, it is possible to recognize a state where the parking-space-leaving instruction of the vehicle 10 cannot be issued by using the smartphone 60. Therefore, the usability is improved.

Second Modification

In the automatic parking-space-leaving control of FIG. 5 described above, an example has been described in which, when the remote-parking instruction operation is not received in step S11, the automatic parking control unit 55 waits until the instruction operation is received, but the present disclosure is not limited thereto. For example, when the remote-parking instruction operation is not received, the user M may be notified that the remote-parking function can be used. Specifically, when a predetermined period of time elapses in which the remote-parking instruction operation is not received, the automatic parking control unit 55 may notify the smartphone 60 of the user M that the remote-parking function can be used, or may display the fact that the remote-parking function can be used on the navigation device 18 of the vehicle 10. Accordingly, for example, when the user M forgets the remote-parking instruction operation, the user M can be notified, and the usability is improved.

Modification of Movement Instruction Control Performed by Smartphone 60

Next, a modification of the movement instruction control of the vehicle 10 performed by the smartphone 60 will be described.

First Modification

Figure 11:
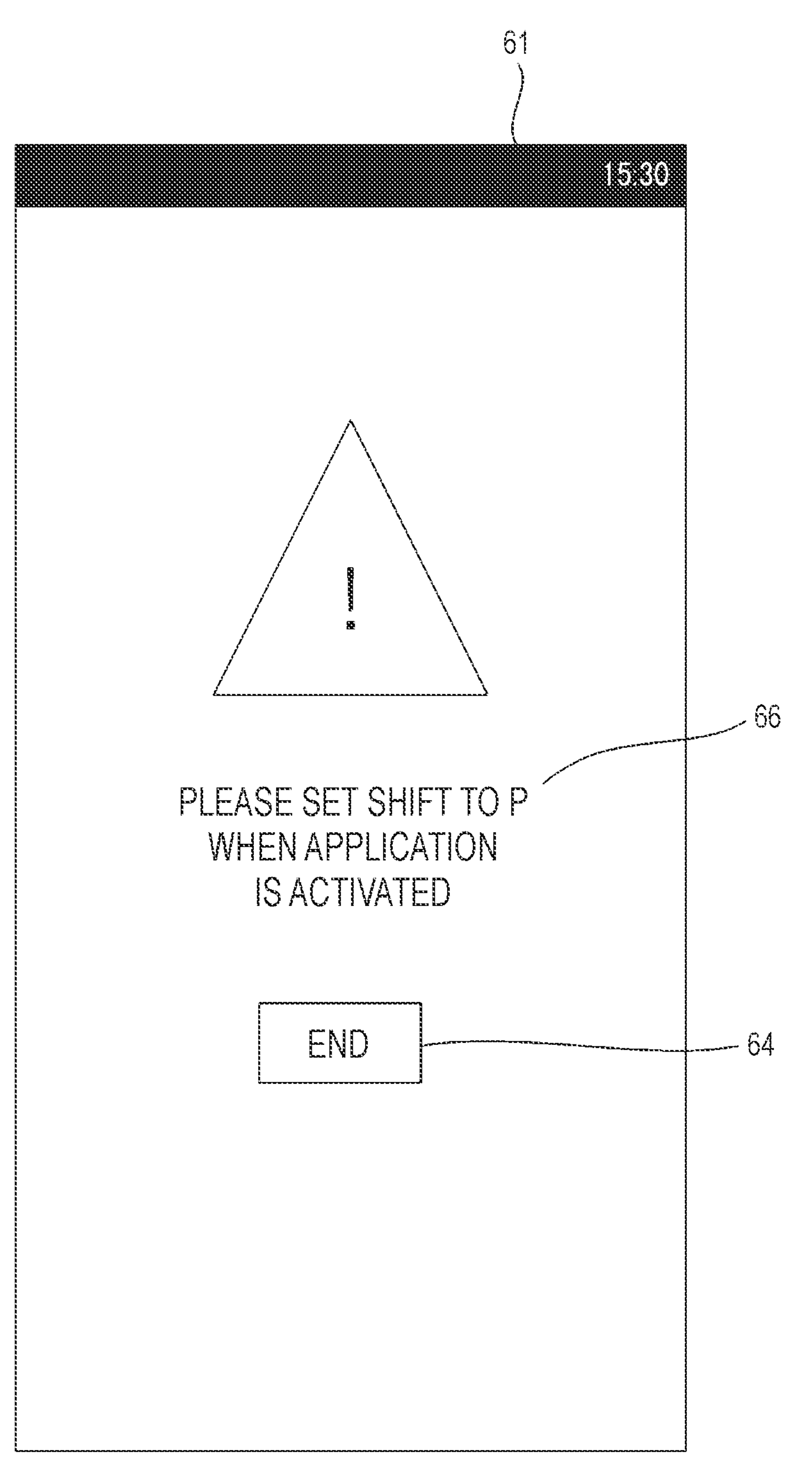
FIG. 11 is a diagram showing an example of a message when a gear state is not shifted to a parking state during an activation operation of an application.

In the parking-space-leaving instruction control of FIG. 6 described above, the smartphone 60 first determines whether the activation operation of the application that issues the movement instruction of the vehicle 10 is received in step S21, and determines whether the inquiry information is received in step S22 when the activation operation is received, but the present disclosure is not limited thereto. For example, when the activation operation of the application is started, the smartphone 60 may determine whether a gear state of the vehicle 10 is shifted to a parking state of the vehicle 10. As a determination result thereof, when the gear state is not shifted to the parking state, for example, a message image 66 such as "please set shift to P when application is activated" as shown in FIG. 11 may be displayed on the smartphone screen 61. Further, the end button 64 may be displayed together with the message image 66, and the parking-space-leaving instruction control may be ended when the end button 64 is touched. Accordingly, for example, it is possible to eliminate forgetting to shift the gear state to the parking state by the user M who intends to instruct the automatic parking-space-leaving control of the vehicle 10 from the smartphone 60, and the usability is improved.

Second Modification

Figure 12:
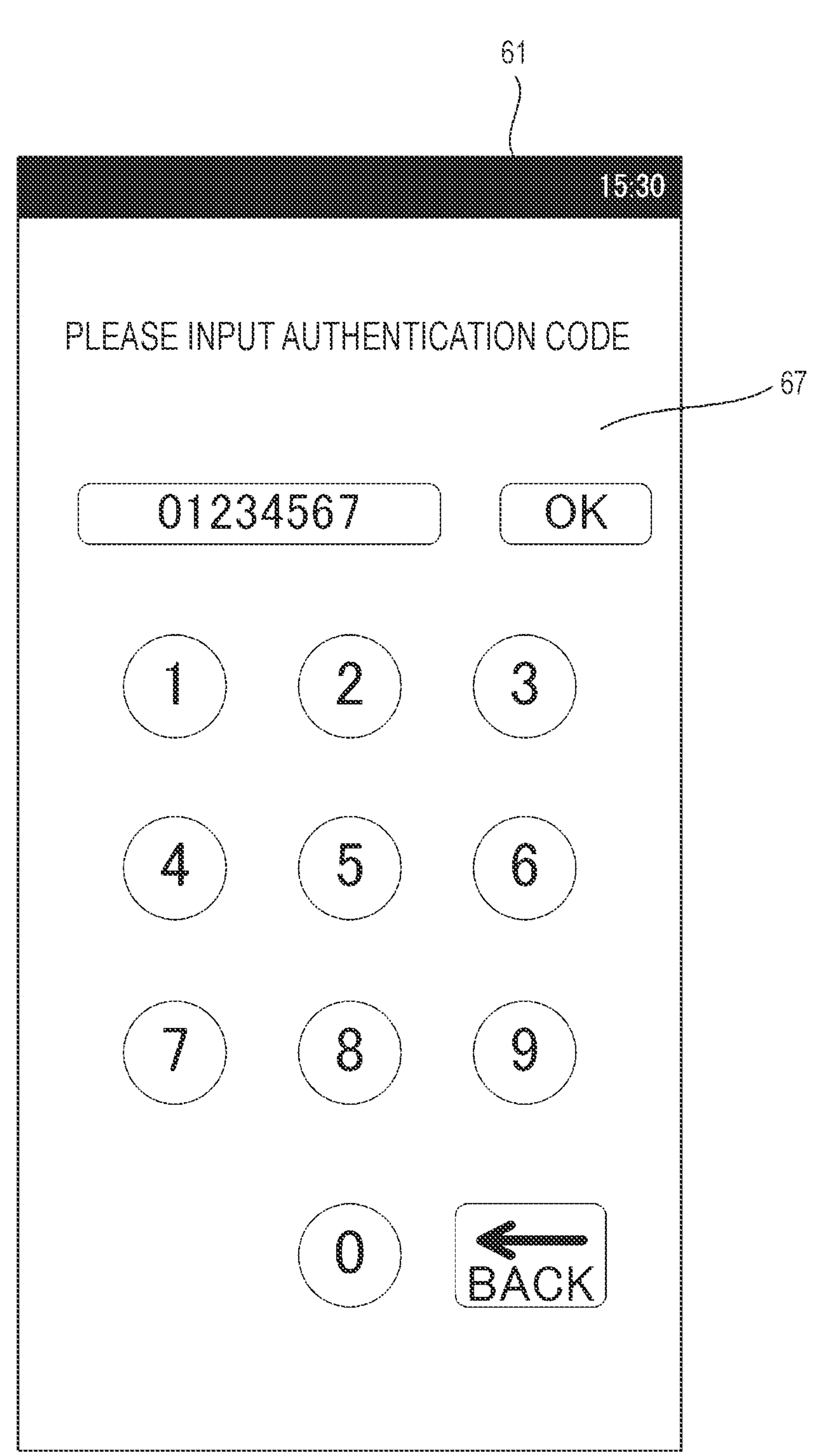
FIG. 12 is a diagram showing an example of a child lock screen displayed during the activation operation of the application.

In the parking-space-leaving instruction control of FIG. 6 described above, the smartphone 60 determines whether the activation operation of the application is received in step S21, and determines whether the inquiry information is received in step S22 when the activation operation is received, but the present disclosure is not limited thereto. For example, when the activation operation of the application is received, a child lock screen 67 as shown in FIG. 12 may be displayed on the smartphone screen 61 of the smartphone 60. After predetermined authentication processing is executed using the child lock screen 67, the reception of the inquiry information in step S22 may be determined. Accordingly, the movement control of the vehicle 10 can be performed based on the movement instruction from the user M who is more suitable for performing the parking-space-leaving instruction control.

Although the embodiment of the present disclosure has been described above, the present disclosure is not limited to the above-described embodiment, and modifications, improvements, and the like can be made as appropriate.

Figure 13:
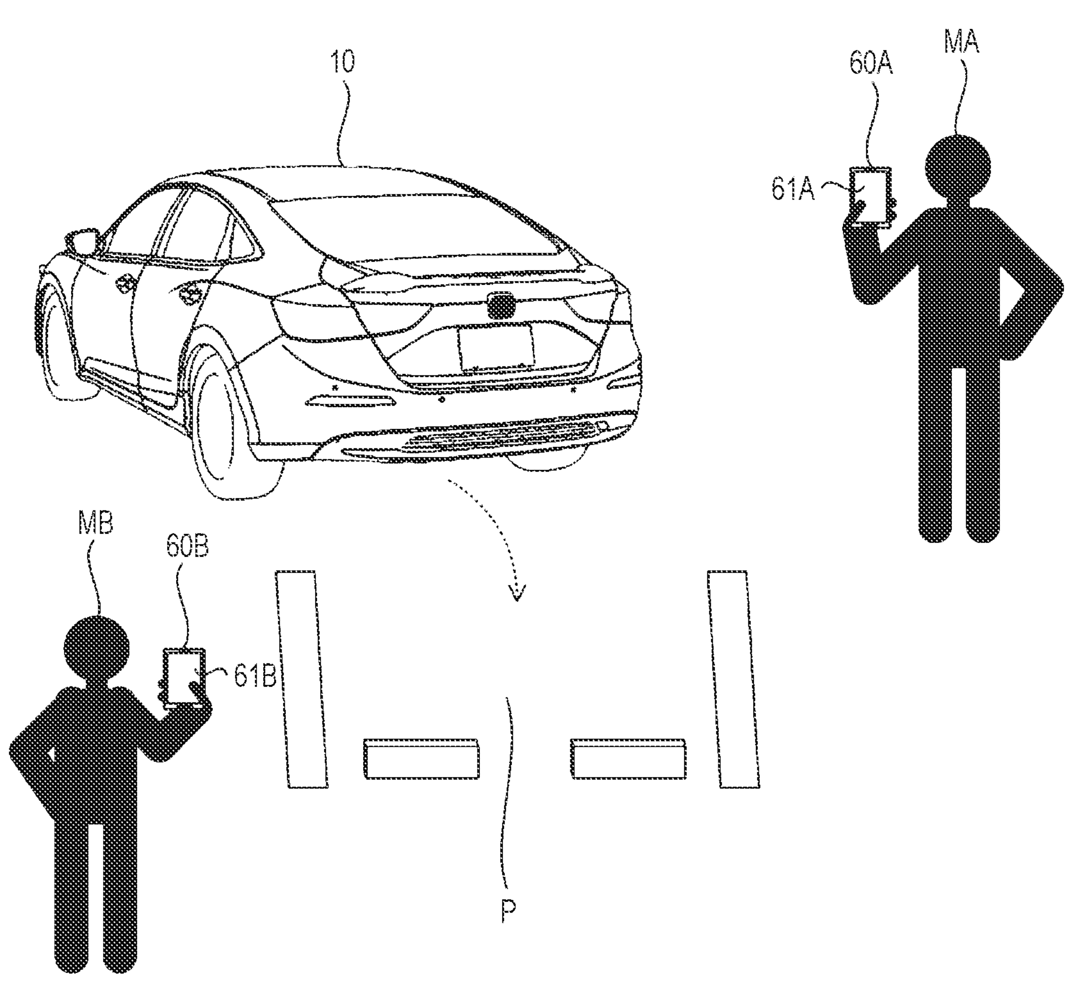
FIG. 13 is a diagram showing a state where the vehicle is under parking instruction control by using the smartphone from the outside of the vehicle.

For example, in the above-described embodiment, a case where the automatic parking-space-leaving of the vehicle 10 is controlled has been described, but the automatic parking of the vehicle 10 can also be controlled in a similar way. FIG. 13 is a diagram showing an example of a state where the users MA and MB of the vehicle 10 perform parking instruction control for automatically parking the vehicle 10 in the parking space P by using the smartphones 60A and 60B carried by the users MA and MB from the outside of the vehicle 10. In this case, even if there are the plurality of users M who desire to perform an instruction operation of the automatic parking of the vehicle 10, the automatic parking of the vehicle 10 can be controlled based on a parking instruction from the appropriate user M who gives an answer accepting the inquiry about the driver determination.

Figure 14:
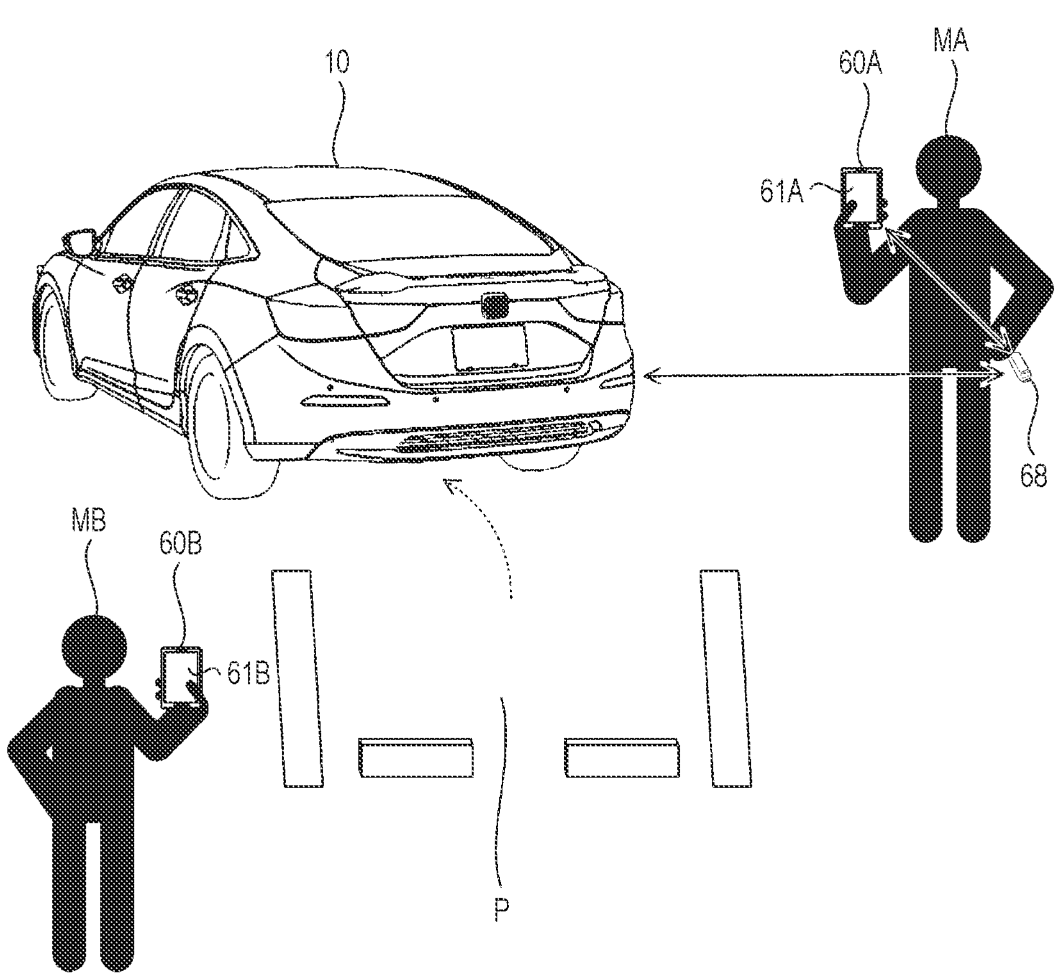
FIG. 14 is a diagram showing a state where the smartphone is used to perform parking-space-leaving instruction control on the vehicle via a smart key.

In the above-described embodiment, a case where direct communication is performed between the vehicle 10 and the smartphone 60 when the automatic parking control unit 55 of the vehicle 10 communicates with the smartphone 60 of the user M has been described, but the present disclosure is not limited thereto. The automatic parking control unit 55 may communicate with the smartphone 60 carried by the user M via, for example, a smart key of the user M. FIG. 14 is a diagram showing an example of a state where the user MA of the vehicle 10 uses the smartphone 60A of the user MA to perform parking-space-leaving instruction control for causing the vehicle 10 to automatically leave the parking space P via the smart key 68 carried by the user MA from the outside of the vehicle 10. The user MB performs direct communication between the user MB and the vehicle 10 by using the smartphone 60B, and performs the parking-space-leaving instruction control for causing the vehicle 10 to automatically leave the parking space.

In the above-described embodiment, an example in which the moving object is a vehicle (four-wheeled automobile) has been described, but the present disclosure is not limited thereto. For example, the moving object may be a vehicle such as a two-wheeled vehicle or a Segway. Further, the concept of the present disclosure can be applied not only to a vehicle but also to a robot, a ship, an aircraft, and the like that are provided with a driving source and that are movable by power of the driving source.

The control method described in the above-described embodiment can be implemented by a computer executing a control program prepared in advance. The control program is recorded in a computer-readable storage medium and is executed by being read from the storage medium. Further, the control program may be provided in a form stored in a non-transitory storage medium such as a flash memory, or may be provided via a network such as the Internet. The computer that executes the control program may be provided in a control device, may be provided in an electronic device such as a smartphone, a tablet terminal, or a personal computer that can communicate with the control device, or may be provided in a server device that can communicate with the control device and the electronic device.

In the present specification, at least the following matters are described. In parentheses, the corresponding components or the like in the above-described embodiment are shown, but the present disclosure is not limited thereto.

(1) A control device (the control ECU 20) of a moving object (the vehicle 10), the control device including:

a communication unit (the communication unit 24) configured to communicate with an information terminal (the smartphone 60) carried by a user (the user M) of the moving object; and a controller (the automatic parking control 55) configured to perform movement control of the moving object, in which when a predetermined operation from the user of the moving object is received, the controller transmits inquiry information on driver determination to the information terminals around the moving object, the controller receives predetermined answer information for the inquiry information, the controller selects an information terminal, which is a transmission source of the answer information received first, as a driver terminal, and the controller performs movement control of the moving object based on movement instruction information from the driver terminal.

According to (1), it is possible to prevent movement instructions from a plurality of users from competing with each other. Accordingly, it is possible to prevent confusion of the user due to the competition. Further, it is possible to prevent interference and a processing load of the control device due to bidirectional communication between a plurality of information terminals and the control device. Further, unlike a case where a first operated information terminal is simply the driver terminal, the movement control of the moving object can be performed based on a movement instruction from a more appropriate user who gives a predetermined answer to an inquiry about the driver determination.

(2) The control device according to (1), in which the information terminal around the moving object is an information terminal whose communication quality with the communication unit satisfies a predetermined condition.

According to (2), the information terminal whose communication in movement control is stable can be set as the driver terminal. Further, a user who is near the moving object and easy to check a situation of the moving object can be set as a driver (a user of the driver terminal).

(3) The control device according to (1) or (2), in which the controller repeatedly transmits the inquiry information, and in which the controller stops transmitting the inquiry information when the answer information is received first.

According to (3), since the transmission of the inquiry information is stopped after the driver terminal is selected, it is possible to prevent inconvenience of a user of an information terminal other than the driver terminal, and usability is improved.

(4) The control device according to any one of (1) to (3), in which the controller transmits, among the information terminals around the moving object, a rejection response to an information terminal other than the driver terminal.

According to (4), since a user of the information terminal other than the driver terminal can recognize that the other user is already a driver, the usability is improved.

(5) The control device according to any one of (1) to (4), in which the inquiry information is information for causing, among the information terminals around the moving object, an information terminal in which an application for issuing a movement instruction of the moving object is activated by a user operation to send an inquiry about the driver determination.

According to (5), since the inquiry about the driver determination is made only to the user who activates the application for issuing the movement instruction of the moving object, the inquiry about the driver determination is prevented from being made to a user who does not intend to issue the movement instruction of the moving object, and the usability is improved.

(6) A control system including:

an information terminal carried by a user of a moving object; and a control device including a communication unit configured to communicate with the information terminal and a controller configured to perform movement control of the moving object, in which when a predetermined operation from the user of the moving object is received, the control device transmits inquiry information on driver determination to the information terminals around the moving object, the control device receives predetermined answer information for the inquiry information, the control device selects an information terminal, which is a transmission source of the answer information received first, as a driver terminal, and the control device performs movement control of the moving object based on movement instruction information from the driver terminal.

According to (6), it is possible to prevent movement instructions from a plurality of users from competing with each other. Accordingly, it is possible to prevent confusion of the user due to the competition. Further, it is possible to prevent interference and a processing load of the control device due to bidirectional communication between a plurality of information terminals and the control device. Further, unlike a case where a first operated information terminal is simply the driver terminal, the movement control of the moving object can be performed based on a movement instruction from a more appropriate user who gives a predetermined answer to an inquiry about the driver determination.

(7) A control method including: by a control device including a communication unit configured to communicate with an information terminal carried by a user of a moving object and a controller configured to perform movement control of the moving object, when a predetermined operation from the user of the moving object is received, transmitting inquiry information on driver determination to the information terminals around the moving object, receiving predetermined answer information for the inquiry information, selecting an information terminal, which is a transmission source of the answer information received first, as a driver terminal; and performing movement control of the moving object based on movement instruction information from the driver terminal.

According to (7), it is possible to prevent movement instructions from a plurality of users from competing with each other. Accordingly, it is possible to prevent confusion of the user due to the competition. Further, it is possible to prevent interference and a processing load of the control device due to bidirectional communication between a plurality of information terminals and the control device. Further, unlike a case where a first operated information terminal is simply the driver terminal, the movement control of the moving object can be performed based on a movement instruction from a more appropriate user who gives a predetermined answer to an inquiry about the driver determination.

(8) A non-transitory computer-readable recording medium storing a control program for causing a processor of a control device including a communication unit configured to communicate with an information terminal carried by a user of a moving object and a controller configured to perform movement control of the moving object to execute processing of:

when a predetermined operation from the user of the moving object is received, transmitting inquiry information on driver determination to the information terminals around the moving object, receiving predetermined answer information for the inquiry information, selecting an information terminal that is a transmission source of the first received answer information as a driver terminal, and performing movement control of the moving object based on movement instruction information from the driver terminal.

According to (8), it is possible to prevent movement instructions from a plurality of users from competing with each other. Accordingly, it is possible to prevent confusion of the user due to the competition. Further, it is possible to prevent interference and a processing load of the control device due to bidirectional communication between a plurality of information terminals and the control device. Further, unlike a case where a first operated information terminal is simply the driver terminal, the movement control of the moving object can be performed based on a movement instruction from a more appropriate user who gives a predetermined answer to an inquiry about the driver determination.

The invention claimed is:

1. A control device of a moving object, the control device comprising:

at least one memory; and at least one processor, wherein the at least one processor is configured to:

communicate with information terminals carried by one or more users of the moving object;

perform remote movement control of the moving object from outside of the moving object, based on the users' operation of the information terminals;

transmit inquiry information on driver determination to the information terminals around the moving object, in response to receiving a start operation for the remote movement control from a user of the one or more users;

receive answer information for the inquiry information, the answer information being received via the information terminals that have received the inquiry information;

select an information terminal from the information terminals around the moving object, which is a transmission source of the answer information that is received first among the answer information received from the information terminals around the moving object, as a driver terminal;

perform remote movement control of the moving object based on movement instruction information from the driver terminal; and transmit information indicating rejection of connection to the information terminals around the moving object other than the driver terminal after the driver terminal is selected, and enable a movement instruction to the moving object via the driver terminal after transmitting the information indicating rejection of connection.

2. The control device according to claim 1, wherein the information terminals around the moving object are information terminals whose communication quality with the at least one processor satisfies a predetermined condition.

3. The control device according to claim 1, wherein the at least one processor is further configured to repeatedly transmit the inquiry information, and wherein the at least one processor is further configured to stop transmitting the inquiry information when the answer information is received first.

4. The control device according to claim 1, wherein the inquiry information is information for causing, among the information terminals around the moving object, an information terminal in which an application for sending a movement instruction of the moving object is activated by a user operation to send an inquiry about the driver determination.

5. A control system comprising:

information terminals carried by one or more users of a moving object; and a control device including at least one memory and at least one processor, wherein the at least one processor is configured to:

communicate with the information terminals carried by one or more users of the moving object;

perform remote movement control of the moving object from outside of the moving object, based on the users' operation of the information terminals;

transmit inquiry information on driver determination to the information terminals around the moving object, in response to receiving a start operation for the remote movement control from a user of the one or more users;

receive answer information for the inquiry information, the answer information being received via the information terminals that have received the inquiry information;

select an information terminal from the information terminals around the moving object, which is a transmission source of the answer information that is received first among the answer information received from the information terminals around the moving object, as a driver terminal;

perform remote movement control of the moving object based on movement instruction information from the driver terminal; and transmit information indicating rejection of connection to the information terminals around the moving object other than the driver terminal after the driver terminal is selected, and enable a movement instruction to the moving object via the driver terminal after transmitting the information indicating rejection of connection.

6. A control method performed by a control device, the method comprising:

communicating with information terminals carried by one or more users of a moving object;

performing remote movement control of the moving object from outside of the moving object, based on the users' operation of the information terminals;

transmitting inquiry information on driver determination to the information terminals around the moving object, in response to receiving a start operation for the remote movement control from a user of the one or more users;

receiving answer information for the inquiry information, the answer information being received via the information terminals that have received the inquiry information;

selecting an information terminal from the information terminals around the moving object, which is a transmission source of the answer information received first among the answer information received from the information terminals around the moving object, as a driver terminal;

performing remote movement control of the moving object based on movement instruction information from the driver terminal; and transmitting information indicating rejection of connection to the information terminals around the moving object other than the driver terminal after the driver terminal is selected, and enabling a movement instruction to the moving object via the driver terminal after transmitting the information indicating rejection of connection.

7. A non-transitory computer-readable recording medium storing a control program for causing a processor to execute a control method according to claim 6.

* * * * *